(12) United States Patent
Sun et al.

(10) Patent No.: US 11,522,644 B2
(45) Date of Patent: Dec. 6, 2022

(54) ACKNOWLEDGEMENT INFORMATION SENDING METHOD AND APPARATUS

(71) Applicant: HUAWEI TECHNOLOGIES CO., LTD., Guangdong (CN)

(72) Inventors: Hao Sun, Beijing (CN); Bingyu Qu, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 193 days.

(21) Appl. No.: 16/693,086

(22) Filed: Nov. 22, 2019

(65) Prior Publication Data
US 2020/0092049 A1 Mar. 19, 2020

Related U.S. Application Data

(63) Continuation of application No. PCT/CN2018/110856, filed on Oct. 18, 2018.

(30) Foreign Application Priority Data

Nov. 17, 2017 (CN) .......................... 201711149106.8

(51) Int. Cl.
H04L 1/18 (2006.01)
H04L 5/00 (2006.01)
(Continued)

(52) U.S. Cl.
CPC .......... *H04L 1/1854* (2013.01); *H04L 1/1812* (2013.01); *H04L 5/0055* (2013.01);
(Continued)

(58) Field of Classification Search
CPC ... H04L 1/1854; H04L 1/1812; H04L 5/0055; H04L 1/1864; H04W 72/0413;
(Continued)

(56) References Cited

U.S. PATENT DOCUMENTS 9,326,299 B2 * 4/2016 Kim ...................... H04B 7/2656
9,763,264 B2 * 9/2017 Yang .......................... H04L 5/14
(Continued)

FOREIGN PATENT DOCUMENTS

CN 102064921 A 5/2011
CN 102164029 A 8/2011
(Continued)

OTHER PUBLICATIONS

CATT: "Discussion on HARQ management and HARQ-ACK feedback",3GPP Draft; R1-1717834, Oct. 3, 2017 (Oct. 3, 2017), XP051352789,total 8 pages.
(Continued)

*Primary Examiner* — Hanh N Nguyen
(74) *Attorney, Agent, or Firm* — Womble Bond Dickinson (US) LLP

(57) ABSTRACT

An acknowledgement information sending method and apparatus is provided. A network device determines and sends downlink scheduling signaling, where the downlink scheduling signaling is used to schedule first downlink data to a terminal, the first downlink data is downlink data corresponding to acknowledgement information fed back on a same uplink control channel, and the downlink scheduling signaling is used to determine a first threshold, a second threshold, or a third threshold. The terminal receives the downlink scheduling signaling sent by the network device, determines, based on the first threshold, the second threshold, or the third threshold, the acknowledgement information corresponding to the first downlink data, and sends the acknowledgement information corresponding to the first downlink data to the network device on the same uplink control channel.

18 Claims, 7 Drawing Sheets

(51) Int. Cl.
*H04W 72/04* (2009.01)
*H04W 72/12* (2009.01)

(52) U.S. Cl.
CPC ..... *H04W 72/042* (2013.01); *H04W 72/0413* (2013.01); *H04W 72/1289* (2013.01)

(58) Field of Classification Search
CPC ........... H04W 72/042; H04W 72/1289; H04W 72/12; H04W 72/1268; H04W 72/0446
See application file for complete search history.

(56) References Cited

U.S. PATENT DOCUMENTS

| | | | |
|---|---|---|---|
| 11,101,928 B2* | 8/2021 | Yeo | H04L 5/0082 |
| 2009/0245212 A1* | 10/2009 | Sambhwani | H04L 1/0026 |
| | | | 370/336 |
| 2016/0233990 A1 | 8/2016 | Yan et al. | |
| 2017/0238333 A1* | 8/2017 | Ling | H04W 72/0446 |
| | | | 370/329 |
| 2017/0331596 A1 | 11/2017 | Guan et al. | |
| 2019/0191487 A1* | 6/2019 | Kwon | H04W 80/02 |
| 2020/0177320 A1* | 6/2020 | Ren | H04L 1/1819 |

FOREIGN PATENT DOCUMENTS

| | | |
|---|---|---|
| CN | 102468940 A | 5/2012 |
| CN | 102904698 A | 1/2013 |
| CN | 104253677 A | 12/2014 |
| CN | 106301670 A | 1/2017 |
| CN | 106452661 A | 2/2017 |
| CN | 106714320 A | 5/2017 |
| CN | 107005372 A | 8/2017 |
| CN | 107104761 A | 8/2017 |
| CN | 107135052 A | 9/2017 |
| CN | 107294660 A | 10/2017 |
| WO | 2016163941 A1 | 10/2016 |
| WO | 2017078033 A1 | 5/2017 |

OTHER PUBLICATIONS

VIVO: "On NR carrier aggregation", 3GPP Draft; R1-1717505, Oct. 3, 2017 (Oct. 3, 2017), XP051352702, total 6 pages.

* cited by examiner

ACKNOWLEDGEMENT INFORMATION SENDING METHOD AND APPARATUS

CROSS-REFERENCE TO RELATED APPLICATIONS

This application is a continuation of International Application No. PCT/CN2018/110856, filed on Oct. 18, 2018, which claims priority to Chinese Patent Application No. 201711149106.8, filed on Nov. 17, 2017. The disclosures of the aforementioned applications are hereby incorporated by reference in their entireties.

TECHNICAL FIELD

The present disclosure relates to the field of communications technologies, and in particular, to an acknowledgement information sending method and apparatus.

BACKGROUND

Currently, in a data transmission process, a hybrid automatic repeat request (HARQ) process is usually used to feed back acknowledgement information, to improve data transmission reliability. The HARQ process includes a downlink HARQ process and an uplink HARQ process. In the downlink HARQ process, a network device sends downlink data to a terminal, and the terminal sends HARQ acknowledgement information to the network device based on reception of the downlink data. The HARQ acknowledgement information usually includes a positive acknowledgement (ACK) instruction or a negative acknowledgement (NACK) instruction. If the terminal correctly receives the downlink data sent by the network device, the terminal sends an ACK to the network device. If the terminal does not correctly receive the downlink data sent by the network device, the terminal sends a NACK to the network device.

As a communications technology develops, a communications system (for example, a fifth-generation 5G communications system) supports a configurable quantity of HARQ processes, and supports dynamic configuration of a HARQ acknowledgement information codebook in a single component carrier (CC) scenario. In the single CC scenario, supporting the dynamic configuration of the HARQ acknowledgement information codebook may be understood as that a quantity of bits used by the terminal to feed back the HARQ acknowledgement information is not fixed or semi-statically configured, but dynamically changes according to a quantity of the downlink data scheduled by the network device.

In the single CC scenario, when the network device schedules the downlink data, each slot includes only one piece of downlink scheduling signaling that is used to instruct the terminal to feed back the HARQ acknowledgement information in a target slot. However, a single piece of downlink scheduling signaling is lost with a relatively high probability, and it is very likely that the terminal skips detecting the downlink scheduling information sent by the network device, so that the terminal cannot correctly determine the quantity of the downlink data scheduled by the network device, and the quantity of bits used for the HARQ acknowledgement information determined by the terminal is inconsistent with a quantity of bits used for HARQ acknowledgement information determined by the network device. Consequently, decoding of the HARQ acknowledgement information fails.

SUMMARY

Embodiments of the present disclosure provide an acknowledgement information sending method and apparatus, so that a quantity of bits used for acknowledgement information determined by a terminal keeps consistent with a quantity of bits used for acknowledgement information determined by a network device.

According to a first aspect, an acknowledgement information sending method is provided. In the method, a network device determines downlink scheduling signaling, where the downlink scheduling signaling can be used to determine a quantity of bits corresponding to acknowledgement information fed back on a same physical uplink control channel (PUCCH). A terminal receives the downlink scheduling signaling sent by the network device, and determines, based on the downlink scheduling signaling, the quantity of bits corresponding to the acknowledgement information fed back on the same uplink control channel. If the network device also determines, based on the downlink scheduling signaling, the quantity of bits corresponding to the acknowledgement information fed back by the terminal on the same uplink control channel, a quantity of bits used for the acknowledgement information determined by the terminal can keep consistent with a quantity of bits used for the acknowledgement information determined by the network device.

In one embodiment, the quantity of bits corresponding to the acknowledgement information fed back on the same uplink control channel is determined based on a first threshold, and the first threshold is a threshold greater than or equal to a total quantity of first downlink data scheduled by the network device to the terminal in A (where A is a positive integer) time units. Specifically, the network device determines the downlink scheduling signaling, where the downlink scheduling signaling is used by the network device to separately schedule the first downlink data to the terminal in the A time units, and the first downlink data is downlink data corresponding to the acknowledgement information fed back on the same uplink control channel. The downlink scheduling signaling determined by the network device is used to determine the first threshold, and the total quantity of the first downlink data scheduled by the network device to the terminal in the A time units does not exceed the first threshold. The network device sends the determined downlink scheduling signaling to the terminal. The terminal separately receives, in the A time units, the downlink scheduling signaling sent by the network device, and the terminal determines, based on the first threshold, the acknowledgement information corresponding to the first downlink data received in the A time units, and sends the acknowledgement information corresponding to the first downlink data to the network device on the same uplink control channel.

In this embodiment of the present disclosure, the quantity of bits of the acknowledgement information that is sent by the terminal and that corresponds to the first downlink data is determined based on the first threshold, the quantity of bits of the acknowledgement information corresponding to the first downlink data is relatively fixed, and therefore indication overheads of the downlink scheduling signaling are relatively low.

In another embodiment, the quantity of bits corresponding to the acknowledgement information fed back on the same uplink control channel is determined based on a second threshold, and the second threshold is a threshold greater than or equal to a total quantity of codewords of the first downlink data scheduled by the network device to the terminal in A (where A is a positive integer) time units. Specifically, the network device determines the downlink scheduling signaling, where the downlink scheduling signaling is used by the network device to separately schedule the first downlink data to the terminal in the A time units, and the first downlink data is downlink data corresponding to the acknowledgement information fed back on the same uplink control channel. The downlink scheduling signaling determined by the network device is used to determine the second threshold, and the total quantity of codewords of the first downlink data scheduled by the network device to the terminal in the A time units does not exceed the second threshold. The network device sends the determined downlink scheduling signaling to the terminal. The terminal separately receives, in the A time units, the downlink scheduling signaling sent by the network device, and the terminal determines, based on the second threshold, the acknowledgement information corresponding to the first downlink data received in the A time units, and sends the acknowledgement information corresponding to the first downlink data to the network device on the same uplink control channel.

In this embodiment of the present disclosure, the quantity of bits of the acknowledgement information that is sent by the terminal and that corresponds to the first downlink data is determined based on the second threshold, so that a quantity of codewords of the first downlink data can be accurately determined, and therefore the quantity of bits used for sending the acknowledgement information corresponding to the first downlink data can be determined more precisely.

In still another embodiment, the quantity of bits corresponding to the acknowledgement information fed back on the same uplink control channel is determined based on a third threshold, and the third threshold is a threshold greater than or equal to a total quantity of code block groups of the first downlink data scheduled by the network device to the terminal in A (where A is a positive integer) time units. Specifically, the network device determines the downlink scheduling signaling, where the downlink scheduling signaling is used by the network device to separately schedule the first downlink data to the terminal in the A time units, and the first downlink data is downlink data corresponding to the acknowledgement information fed back on the same uplink control channel. The downlink scheduling signaling determined by the network device is used to determine the third threshold, and the total quantity of code block groups of the first downlink data scheduled by the network device to the terminal in the A time units does not exceed the third threshold. The network device sends the determined downlink scheduling signaling to the terminal. The terminal separately receives, in the A time units, the downlink scheduling signaling sent by the network device, and the terminal determines, based on the third threshold, the acknowledgement information corresponding to the first downlink data received in the A time units, and sends the acknowledgement information corresponding to the first downlink data to the network device on the same uplink control channel.

In this embodiment of the present disclosure, the quantity of bits of the acknowledgement information that is sent by the terminal and that corresponds to the first downlink data is determined based on the third threshold, so that a quantity of code block groups of the first downlink data can be accurately determined, and therefore the quantity of bits used for sending the acknowledgement information corresponding to the first downlink data can be determined more precisely.

The A time units may be continuous time units, or may be discrete time units.

The first downlink data may be at least one of a physical downlink shared (data) channel (PDSCH) scheduled by the network device by using a physical downlink control channel (PDCCH), a physical downlink data channel (PDSCH) scheduled by using an enhanced physical downlink control channel (EPDCCH), and a physical downlink data channel (PDSCH) scheduled through semi-persistent scheduling (SPS).

In yet another embodiment, the downlink scheduling signaling sent by the network device to the terminal may include indication information, and the indication information is used to indicate the first threshold, or used to indicate the second threshold, or used to indicate the third threshold. The terminal receives the downlink scheduling signaling including the indication information, and may directly determine the first threshold, the second threshold, or the third threshold based on the first threshold, the second threshold, or the third threshold indicated by the indication information, thereby reducing signaling indication overheads of the downlink scheduling signaling.

In still yet another embodiment, the indication information included in the downlink scheduling signaling may indicate the first threshold, the second threshold, or the third threshold by using K bits.

K is a positive integer. In one embodiment, K may be 2 or 3.

In a further embodiment, in this embodiment of the present disclosure, different values of the K bits may be used to indicate different values of the first threshold, or indicate different values of the second threshold, or indicate different values of the third threshold. In one embodiment, the K bits correspond to 2K values. At least one of the 2K values is used to indicate a different value of the first threshold, and the at least one of the 2K values has a one-to-one correspondence with a value of the first threshold. Alternatively, at least one of the 2K values is used to indicate a different value of the second threshold, and the at least one of the 2K values has a one-to-one correspondence with a value of the second threshold. Alternatively, at least one of the 2K values is used to indicate a different value of the third threshold, and the at least one of the 2K values has a one-to-one correspondence with a value of the third threshold. In this embodiment of the present disclosure, the terminal can accurately determine the value of the first threshold, the value of the second threshold, or the value of the third threshold based on a binary bit value used to indicate the value of the first threshold, a binary bit value used to indicate the value of the second threshold, or a binary bit value used to indicate the value of the third threshold.

In a still further embodiment, the first threshold indicated by the indication information includes at least a first threshold with a value 1, or the second threshold indicated by the indication information includes at least a second threshold with a value M, or the third threshold indicated by the indication information includes at least a third threshold with a value N, and M and N are positive integers.

In a yet further embodiment, the value of the first threshold, the value of the second threshold, or the value of the third threshold is determined based on a quantity of hybrid automatic repeat request (HARQ) processes. It can be understood that the quantity of HARQ processes is a quantity of HARQ processes of the terminal.

Specifically, when the quantity of HARQ processes is 8, the value of the first threshold determined based on the quantity of HARQ processes is at least one of 2, 4, 6, and 8, or the value of the second threshold determined based on the quantity of HARQ processes is at least one of 2M, 4M, 6M, and 8M, or the value of the third threshold determined based on the quantity of HARQ processes is at least one of 2N, 4N, 6N, and 8N. Alternatively, when the quantity of HARQ processes is 16, the value of the first threshold determined based on the quantity of HARQ processes is at least one of 4, 8, 12, and 16, or the value of the second threshold determined based on the quantity of HARQ processes is at least one of 4M, 8M, 12M, and 16M, or the value of the third threshold determined based on the quantity of HARQ processes is at least one of 4N, 8N, 12N, and 16N. Alternatively, when the quantity of HARQ processes is 16, the value of the first threshold determined based on the quantity of HARQ processes is at least one of 2, 4, 6, 8, 10, 12, 14, and 16, or the value of the second threshold determined based on the quantity of HARQ processes is at least one of 2M, 4M, 6M, 8M, 10M, 12M, 14M, and 16M, or the value of the third threshold determined based on the quantity of HARQ processes is at least one of 2N, 4N, 6N, 8N, 10N, 12N, 14N, and 16N, where M and N are positive integers.

In a still yet further embodiment, the value of the first threshold is configured by the network device by using higher layer signaling, or the value of the second threshold is configured by the network device by using higher layer signaling, or the value of the third threshold is configured by the network device by using higher layer signaling.

In an even yet another embodiment, first thresholds determined by using all of the downlink scheduling signaling used by the network device to schedule the first downlink data to the terminal in the A time units are the same, and first thresholds determined by using all of the downlink scheduling signaling received by the terminal in the A time units are the same. Alternatively, second thresholds determined by using all of the downlink scheduling signaling used by the network device to schedule the first downlink data to the terminal in the A time units are the same, and second thresholds determined by using all of the downlink scheduling signaling received by the terminal in the A time units are the same. Alternatively, third thresholds determined by using all of the downlink scheduling signaling used by the network device to schedule the first downlink data to the terminal in the A time units are the same, and third thresholds determined by using all of the downlink scheduling signaling received by the terminal in the A time units are the same.

According to a second aspect, an acknowledgement information sending apparatus is provided. The acknowledgement information sending apparatus may be a network device, or may be a chip in the network device. The network device or the chip has a function of implementing the acknowledgement information sending method performed by the network device in the first aspect or any possible design of the first aspect. The function may be implemented by hardware, or may be implemented by hardware by executing corresponding software. The hardware or the software includes one or more units corresponding to the function.

The network device includes a processing unit and a transceiver unit. The processing unit may be a processor, the transceiver unit may be a transceiver, and the transceiver includes a radio frequency circuit. In one embodiment, the network device further includes a storage unit, and the storage unit, for example, may be a memory. When the network device includes the storage unit, the storage unit is configured to store a computer executable instruction. The processing unit is connected to the storage unit, and the processing unit executes the computer executable instruction stored in the storage unit, so that the network device performs the acknowledgement information sending method performed by the network device in the first aspect or any possible design of the first aspect.

The chip includes a processing unit and a transceiver unit. The processing unit may be a processor, and the transceiver unit may be an input/output interface, a pin, a circuit, or the like on the chip. The processing unit may execute the computer executable instruction stored in the storage unit, so that the chip performs the acknowledgement information sending method performed by the network device in the first aspect or any possible design of the first aspect. In one embodiment, the storage unit may be a storage unit (for example, a register or a buffer) in the chip. Alternatively, the storage unit may be a storage unit (for example, a read-only memory) that is in the network device and that is located outside of the chip, or may be another type of static storage device (for example, a random access memory) or the like that can store static information and an instruction.

According to a third aspect, an acknowledgement information sending apparatus is provided. The acknowledgement information sending apparatus may be a terminal, or may be a chip in the terminal. The terminal or the chip has a function of implementing the acknowledgement information sending method performed by the terminal in the first aspect or any possible design of the first aspect. The function may be implemented by hardware, or may be implemented by hardware by executing corresponding software. The hardware or the software includes one or more units corresponding to the function.

The terminal includes a receiving unit, a processing unit, and a sending unit. The processing unit may be a processor, the receiving unit may be a receiver, the sending unit may be a transmitter, and the receiver and the transmitter may include a radio frequency circuit. In one embodiment, the terminal further includes a storage unit, and the storage unit, for example, may be a memory. When the terminal includes the storage unit, the storage unit is configured to store a computer executable instruction. The processing unit is connected to the storage unit, and the processing unit executes the computer executable instruction stored in the storage unit, so that the terminal performs the acknowledgement information sending method performed by the terminal in the first aspect or any possible design of the first aspect.

The chip includes a receiving unit, a processing unit, and a sending unit. The processing unit may be a processor, and the receiving unit and the sending unit may be an input/output interface, a pin, a circuit, or the like on the chip. The processing unit may execute the computer executable instruction stored in the storage unit, so that the chip performs the acknowledgement information sending method performed by the terminal in the first aspect or any possible design of the first aspect. In one embodiment, the storage unit may be a storage unit (for example, a register or a buffer) in the chip. Alternatively, the storage unit may be a storage unit (for example, a read-only memory) that is in the terminal and that is located outside of the chip, or may be another type of static storage device (for example, a random access memory) or the like that can store static information and an instruction.

The processor related to the second aspect or the third aspect may be a central processing unit, a microprocessor, or an application-specific integrated circuit, or may be one or more integrated circuits configured to control execution of a program in the acknowledgement information sending method performed by the terminal in the first aspect or any possible design of the first aspect.

According to a fourth aspect, an embodiment of the present disclosure provides a computer readable storage medium. The computer readable storage medium stores a computer instruction. When the instruction runs on a computer, the acknowledgement information sending method performed by the network device or the terminal in the first aspect or any possible design of the first aspect can be completed.

According to a fifth aspect, an embodiment of the present disclosure provides a computer program product. The computer program product includes a computer program, and the computer program is used to complete the acknowledgement information sending method performed by the network device or the terminal in the first aspect or any possible design of the first aspect.

In the embodiments of the present disclosure, the downlink scheduling signaling sent by the network device to the terminal is used to schedule the first downlink data, and is used to determine the first threshold, the second threshold, or the third threshold; and the terminal receives the downlink scheduling signaling sent by the network device, determines, based on the first threshold, the second threshold, or the third threshold, the quantity of bits of the acknowledgement information corresponding to the first downlink data, and sends, on the same uplink control channel, the acknowledgement information of the first downlink data. If the network device also determines, based on the first threshold, the second threshold, or the third threshold, the quantity of bits of the acknowledgement information corresponding to the first downlink data, a quantity of bits of acknowledgement information determined by the terminal can keep consistent with a quantity of bits of acknowledgement information determined by the network device.

DESCRIPTION OF EMBODIMENTS

Figure 1:
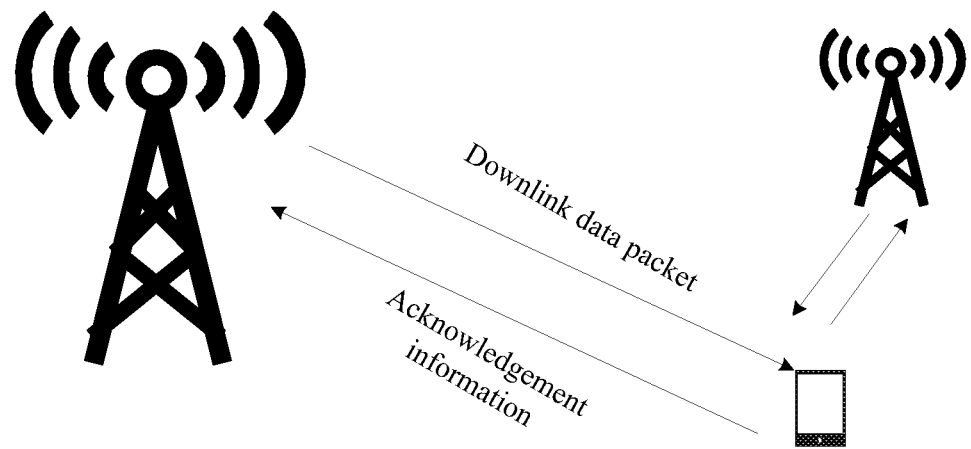
FIG. 1 is an architectural diagram of a system applied to an embodiment of the present disclosure.

The following describes technical solutions in embodiments of the present disclosure with reference to accompanying drawings.

Some terms in the present disclosure are first explained, so as to help a person skilled in the art have a better understanding.

(1) Network device: Also referred to as a radio access network (RAN) node (or a device), a network device is a device that connects a terminal to a wireless network, and may also be referred to as a base station. Currently, the RAN node is, for example, a continuously evolved NodeB (gNB), a transmission reception point (TRP), an evolved NodeB (eNB), a radio network controller (RNC), a NodeB (NB), a base station controller (BSC), a base transceiver station (BTS), a home NodeB (for example, a home evolved NodeB, or a home Node B, HNB), a baseband unit (BBU), or a wireless fidelity (Wifi) access point (AP). In addition, in a network structure, the RAN node may include a centralized unit (CU) node and a distributed unit (DU) node. In the structure, a protocol layer of an eNB in a long term evolution (LTE) system is split, functions of some protocol layers are controlled by a CU in a centralized manner, functions of remaining parts or all protocol layers are distributed in a DU, and the CU controls the DU in a centralized manner.

(2) Terminal: Also referred to as user equipment (UE), a mobile station (MS), a mobile terminal (MT), terminal equipment, a transmission point (transmission and receiver point, TRP, or transmission point, TP), or the like, a terminal is a device that provides a user with voice and/or data connectivity, for example, a handheld device with a wireless connection function or a vehicular device. Currently, the terminal is, for example, a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in a remote medical surgery, a wireless terminal in a smart grid, a wireless terminal in transportation safety, a wireless terminal in a smart city, or a wireless terminal in a smart home.

(3) Downlink data: Downlink data may be understood as data sent by a network device to a terminal. The downlink data may be at least one of a physical downlink data channel (PDSCH) scheduled by using a physical downlink control channel (PDCCH), a PDSCH scheduled by using an enhanced physical downlink control channel (EPDCCH), and a PDSCH scheduled through semi-persistent scheduling (SPS).

(4) Acknowledgement information corresponding to downlink data: Acknowledgement information corresponding to downlink data may be understood as feedback information that represents whether a terminal receives data sent by a network device. For example, the network device sends the downlink data to the terminal in downlink transmission by using a specified frame format, and the terminal needs to feed back acknowledgement information of the downlink data in uplink transmission by using a frame format corresponding to the specified frame format. The acknowledgement information may be an ACK or a NACK. When different feedback mechanisms are used, the acknowledgement information may have different names. For example, when a HARQ feedback mechanism is used, the acknowledgement information may be referred to as HARQ acknowledgement information. The acknowledgement information may be sent by using a physical uplink control channel (PUCCH) resource.

(5) Codeword (CW): A codeword may be understood as a composition unit of a transport block, and each transport block includes a specified quantity of codewords, for example, one transport block corresponds to one codeword.

(6) Code block group (CBG): A CBG may be a basic data transmission unit, and one transport block may include one or more CBGs. One codeword may include one or more CBGs.

(7) Component carrier (CC): A CC may be understood as a composition unit of a carrier used for data transmission between a network device and a terminal. In a single CC scenario, in a determined time unit, data exchange may occur on only one CC between the network device and the terminal.

(8) Time unit: A time unit may be understood as a time domain resource unit used to send and receive data in time domain. For example, the time unit may be a slot, or may be a subframe, or may be one or more OFDM symbols.

(9) Terms "network" and "system" are usually used interchangeably. Information, signal, message, and channel may be interchangeably used sometimes. "of", "relevant (corresponding)", and "corresponding" may be interchangeably used sometimes. It should be noted that, when differences between the terms are not emphasized, meanings to be expressed by the terms are consistent, and a person skilled in the art can understand the meanings.

(10) "A plurality of" refers to two or more. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

An acknowledgement information sending method provided in an embodiment of the present disclosure may be applied to a system architecture shown in FIG. 1. In FIG. 1, data transmission may be performed between a network device and a terminal. In a data transmission process, data sent by the network device to the terminal may be referred to as downlink data, and data sent by the terminal to the network device may be referred to as uplink data. To improve data transmission reliability, during data transmission between the network device and the terminal, acknowledgement information may be sent by using a feedback mechanism such as a HARQ mechanism. In this embodiment of the present disclosure, a process that the network device sends downlink data to the terminal, and the terminal receives the downlink data sent by the network device and sends acknowledgement information corresponding to the downlink data to the network device is mainly described. In the process, the network device may send downlink scheduling signaling to the terminal, schedule the downlink data to the terminal by using the downlink scheduling signaling, and schedule, to the terminal, the acknowledgement information corresponding to the downlink data.

As a communications technology develops, a communications system has already been evolved to a fifth-generation (5G) new radio (NR) communications system, and the following of the embodiments of the present disclosure uses application to a 5G NR communications system an example for description. It should be noted that the solutions in the embodiments of the present disclosure may be also applied to other wireless communications networks.

In the 5G NR communications system, a terminal may be located in a plurality of architectures or configurations of an NR network, for example, a single carrier, a multicarrier, a multi-cell, and a high density cell having a macro eNB/micro eNB and a remote unit. For a terminal in a single carrier scenario, a network device sends downlink scheduling signaling to the terminal in each time unit by using only one component carrier. The downlink scheduling signaling is used to schedule downlink data to the terminal, and may be used to determine a quantity of bits used for acknowledgement information. The terminal may receive, in a corresponding time unit, the downlink scheduling signaling sent by the network device. However, a single piece of downlink scheduling signaling is lost with a relatively high probability, and it is very likely that the terminal skips detecting the downlink scheduling signaling sent by the network device. In the 5G NR communications system, the quantity of bits used by the terminal to feed back the acknowledgement information dynamically changes according to a quantity of the downlink data scheduled by the network device. If the terminal skips detecting the downlink scheduling signaling sent by the network device, the terminal cannot correctly determine the quantity of the downlink data scheduled by the network device, a quantity of bits used for the acknowledgement information determined by the terminal is inconsistent with a quantity of bits used for acknowledgement information determined by the network device, and the network device cannot correctly decode the acknowledgement information.

In the single carrier scenario, the network device may send downlink scheduling signaling to the terminal in different time units, and schedule downlink data to the terminal by using the downlink scheduling signaling. The terminal receives, in corresponding different time units, the downlink scheduling signaling sent by the network device, and sends, to the network device based on whether the downlink data scheduled by using the downlink scheduling signaling is received, the acknowledgement information corresponding to the downlink data. The terminal may feed back, on different PUCCHs, the acknowledgement information that is received in the different time units and that corresponds to the downlink data, or may feed back, on a same PUCCH, the acknowledgement information that is received in a plurality of time units and that corresponds to the downlink data. For ease of description, in this embodiment of the present disclosure, downlink data corresponding to acknowledgement information that is fed back on a same PUCCH is referred to as first downlink data, and downlink data corresponding to acknowledgement information that is fed back on different PUCCHs is referred to as second downlink data.

Further, in this embodiment of the present disclosure, that acknowledgement information corresponding to the first downlink data scheduled by the network device to the terminal in A time units is fed back on a same PUCCH is used as an example for description, where A is a positive integer. The A time units may be continuous time units, or may be discrete time units.

In a scenario in which the acknowledgement information is fed back on the same PUCCH, in this embodiment of the present disclosure, a downlink assignment indicator (DAI) used to determine a quantity of bits corresponding to the acknowledgement information fed back on the same PUCCH may be added to the downlink scheduling signaling sent by the network device to the terminal, so that after receiving the downlink scheduling signaling, the terminal can determine the quantity of bits corresponding to the acknowledgement information fed back on the same PUCCH. If the network device also determines, based on the downlink scheduling signaling, the quantity of bits corresponding to the acknowledgement information fed back by the terminal on the same PUCCH, a quantity of bits used for HARQ acknowledgement information determined by the terminal can keep consistent with a quantity of bits used for HARQ acknowledgement information determined by the network device. The network device decodes the acknowledgement information based on the determined quantity of bits of the acknowledgement information, and therefore a decoding success ratio can be increased.

In this embodiment of the present disclosure, the quantity of bits corresponding to the acknowledgement information fed back on the same PUCCH may be determined based on a total quantity of downlink data scheduled by the network device to the terminal in a plurality of time units, a total quantity of codewords of the downlink data, or a total quantity of code block groups of the downlink data.

In view of this, an embodiment of the present disclosure provides a first acknowledgement information sending method. In the first acknowledgement information sending method, a network device sends downlink scheduling signaling to a terminal. The downlink scheduling signaling is used to schedule first downlink data to the terminal, and is used to determine a threshold greater than or equal to a total quantity of the first downlink data scheduled to the terminal in A (where A is a positive integer) time units. In this embodiment of the present disclosure, for ease of description, the threshold greater than or equal to the total quantity of the first downlink data scheduled by the network device to the terminal in the A time units is referred to as a first threshold. The terminal receives the downlink scheduling signaling sent by the network device, determines, based on the first threshold included in the downlink scheduling signaling, a quantity of bits used for acknowledgement information corresponding to the first downlink data, and sends the acknowledgement information corresponding to the first downlink data to the network device on a same uplink control channel based on the determined quantity of bits. The network device also performs decoding based on the quantity of bits used for the acknowledgement information determined based on the first threshold, so that a quantity of bits used for acknowledgement information determined by the terminal can keep consistent with a quantity of bits used for acknowledgement information determined by the network device.

An embodiment of the present disclosure further provides a second acknowledgement information sending method. In the second acknowledgement information sending method, a network device sends downlink scheduling signaling to a terminal. The downlink scheduling signaling is used to schedule first downlink data to the terminal, and is used to determine a threshold greater than or equal to a total quantity of codewords of the first downlink data scheduled to the terminal in A (where A is a positive integer) time units. In this embodiment of the present disclosure, for ease of description, the threshold greater than or equal to the total quantity of codewords of the first downlink data scheduled by the network device to the terminal in the A time units is referred to as a second threshold. The terminal receives the downlink scheduling signaling sent by the network device, determines, based on the second threshold included in the downlink scheduling signaling, a quantity of bits used for acknowledgement information corresponding to the first downlink data, and sends the acknowledgement information corresponding to the first downlink data to the network device on a same uplink control channel based on the determined quantity of bits. The network device also performs decoding based on the quantity of bits used for the acknowledgement information determined based on the second threshold, so that a quantity of bits used for acknowledgement information determined by the terminal can keep consistent with a quantity of bits used for acknowledgement information determined by the network device.

An embodiment of the present disclosure further provides a third acknowledgement information sending method. In the third acknowledgement information sending method, a network device sends downlink scheduling signaling to a terminal. The downlink scheduling signaling is used to schedule first downlink data to the terminal, and is used to determine a threshold greater than or equal to a total quantity of code block groups of the first downlink data scheduled to the terminal in A (where A is a positive integer) time units. In this embodiment of the present disclosure, for ease of description, the threshold greater than or equal to the total quantity of code block groups of the first downlink data scheduled by the network device to the terminal in the A time units is referred to as a third threshold. The terminal receives the downlink scheduling signaling sent by the network device, determines, based on the third threshold included in the downlink scheduling signaling, a quantity of bits used for acknowledgement information corresponding to the first downlink data, and sends the acknowledgement information corresponding to the first downlink data to the network device on a same uplink control channel based on the determined quantity of bits. The network device also performs decoding based on the quantity of bits used for the acknowledgement information determined based on the third threshold, so that a quantity of bits used for acknowledgement information determined by the terminal can keep consistent with a quantity of bits used for acknowledgement information determined by the network device.

Figure 2:
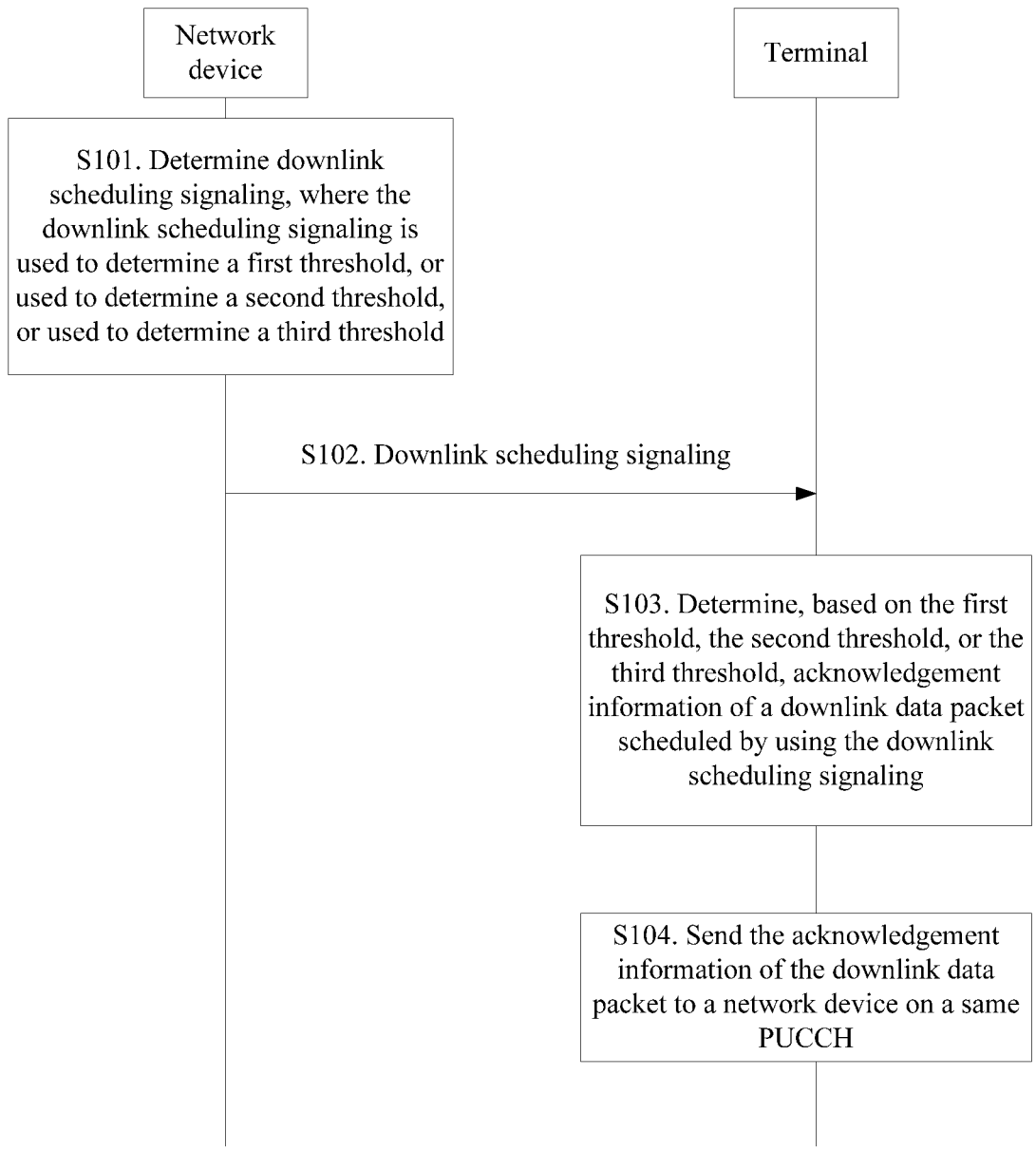
FIG. 2 is a flowchart of an acknowledgement information sending method according to an embodiment of the present disclosure.

FIG. 2 is an implementation flowchart of an acknowledgement information sending method according to an embodiment of the present disclosure. As shown in FIG. 2, the method includes the following operations.

Operation S101. A network device determines downlink scheduling signaling.

In this embodiment of the present disclosure, the downlink scheduling signaling determined by the network device is used to schedule first downlink data to a terminal.

In this embodiment of the present disclosure, the network device may determine downlink scheduling signaling sent to the terminal in one time unit, or may determine downlink scheduling signaling sent to the terminal in a plurality of time units. For example, the network device may determine downlink scheduling signaling sent in A time units from a time unit n+k0 to a time unit n+k1, where n, k0, and k1 are positive integers, k0 is less than or equal to k1, and A is less than or equal to (k1−k0). It should be noted that the downlink scheduling signaling sent in the A time units from the time unit n+k0 to the time unit n+k1 may be downlink scheduling signaling sent in all continuous time units from the time unit n+k0 to the time unit n+k1, or may be downlink scheduling signaling sent in discrete time units from the time unit n+k0 to the time unit n+k1.

In this embodiment of the present disclosure, the downlink scheduling signaling used to schedule the first downlink data to the terminal may be further used to determine a quantity of bits used for acknowledgement information that is sent by the terminal and that corresponds to the first downlink data.

In one embodiment, the downlink scheduling signaling used to schedule the first downlink data to the terminal may be used to determine a first threshold. The first threshold may be understood as a threshold greater than or equal to a total quantity of the first downlink data scheduled by the network device to the terminal in the A time units. A quantity of bits of acknowledgement information corresponding to each piece of first downlink data is definite, and therefore the network device may determine, based on the first threshold, the quantity of bits of the acknowledgement information that is sent by the terminal and that corresponds to the first downlink data. A quantity of bits of acknowledgement information corresponding to one piece of first downlink data is usually 1 or 2. Therefore, in this manner of determining the first threshold, indication overheads of the downlink scheduling signaling are relatively low.

In another embodiment, the downlink scheduling signaling used to schedule the first downlink data to the terminal may be used to determine a second threshold. The second threshold may be understood as a threshold greater than or equal to a total quantity of codewords of the first downlink data scheduled by the network device to the terminal in the A time units. A quantity of bits of acknowledgement information corresponding to each codeword is definite, and therefore the network device may determine, based on the second threshold, the quantity of bits of the acknowledgement information that is sent by the terminal and that corresponds to the first downlink data. Compared with the manner of determining the first threshold, in this manner, the quantity of codewords of the first downlink data can be accurately determined, and therefore the quantity of bits used for sending the acknowledgement information corresponding to the first downlink data can be more precisely determined.

In still another embodiment, the downlink scheduling signaling used to schedule the first downlink data to the terminal may be used to determine a third threshold. The third threshold may be understood as a threshold greater than or equal to a total quantity of code block groups of the first downlink data scheduled by the network device to the terminal in the A time units. A quantity of bits corresponding to each codeword is definite, and therefore the network device may determine, based on the third threshold, the quantity of bits of the acknowledgement information that is sent by the terminal and that corresponds to the first downlink data. Compared with the manner of determining the first threshold, in this manner, the quantity of code block groups of the first downlink data can be accurately determined, and therefore the quantity of bits used for sending the acknowledgement information corresponding to the first downlink data can be more precisely determined.

In this embodiment of the present disclosure, the downlink scheduling signaling determined by the network device is used to determine the first threshold, or used to determine the second threshold, or used to determine the third threshold, the first threshold is the threshold greater than or equal to the total quantity of the first downlink data scheduled by the network device to the terminal in the A time units, the second threshold is the threshold greater than or equal to the total quantity of codewords of the first downlink data scheduled by the network device to the terminal in the A time units, and the third threshold is the threshold greater than or equal to the total quantity of code block groups of the first downlink data scheduled by the network device to the terminal in the A time units. Therefore, the quantity of bits used for the acknowledgement information determined based on the first threshold, the quantity of bits used for the acknowledgement information determined based on the second threshold, or the quantity of bits used for the acknowledgement information determined based on the third threshold may be understood to be for acknowledgement information corresponding to all first downlink data received by the terminal in the A time units, and understood as supplementary bit information used to be padded to the first threshold, the second threshold, or the third threshold. The supplementary bit information is the same as bit information corresponding to a negative acknowledgement.

It can be understood that, in this embodiment of the present disclosure, the downlink scheduling signaling determined by the network device may be further used to indicate that the acknowledgement information corresponding to the first downlink data scheduled by using the downlink scheduling signaling sent in the A time units is fed back on a same PUCCH. For example, the downlink scheduling signaling determined by the network device may be used to indicate that the acknowledgement information is fed back on the same PUCCH in a time unit n+k2, where k2 is a positive integer and is greater than k1.

Further, in this embodiment of the present disclosure, the first downlink data scheduled by the network device may be a PDSCH scheduled by the network device by using at least one of a PDCCH, an EPDCCH, and SPS.

Operation S102. The network device sends the downlink scheduling signaling to the terminal, and the terminal receives the downlink scheduling signaling sent by the network device.

In this embodiment of the present disclosure, the network device may send the determined downlink scheduling signaling to the terminal in a corresponding time unit in which the downlink scheduling signaling is sent. For example, the network device may send the downlink scheduling signaling to the terminal in the A time units from the time unit n+k0 to the time unit n+k1.

In this embodiment of the present disclosure, the terminal may receive the downlink scheduling signaling in a corresponding time unit in which the network device sends the downlink scheduling signaling. For example, the terminal may receive, in the A time units from the time unit n+k0 to the time unit n+k1, the downlink scheduling signaling sent by the network device to the terminal.

Operation S103. The terminal determines, based on the received downlink scheduling signaling, the acknowledgement information corresponding to the first downlink data scheduled by using the downlink scheduling signaling.

In this embodiment of the present disclosure, if the terminal receives the downlink scheduling signaling sent by the network device, and the downlink scheduling signaling includes the first threshold, the terminal may determine, based on the first threshold, the acknowledgement information that is sent by the terminal and that corresponds to the first downlink data. Specifically, the terminal may determine, based on the first threshold, a quantity of bits used for the acknowledgement information.

In this embodiment of the present disclosure, if the terminal receives the downlink scheduling signaling sent by the network device, and the downlink scheduling signaling includes the second threshold, the terminal may determine, based on the second threshold, the acknowledgement information that is sent by the terminal and that corresponds to the first downlink data. Specifically, the terminal may determine, based on the second threshold, a quantity of bits used for the acknowledgement information.

In this embodiment of the present disclosure, if the terminal receives the downlink scheduling signaling sent by the network device, and the downlink scheduling signaling includes the third threshold, the terminal may determine, based on the third threshold, the acknowledgement information that is sent by the terminal and that corresponds to the first downlink data. Specifically, the terminal may determine, based on the third threshold, a quantity of bits used for the acknowledgement information.

In this embodiment of the present disclosure, after receiving the downlink scheduling signaling sent by the network device, the terminal may generate, based on the first threshold, the second threshold, or the third threshold included in the downlink scheduling signaling, the acknowledgement information corresponding to the first downlink data. For example, the downlink scheduling signaling received by the terminal indicates that the first threshold is 8, and corresponds to 16 bits of acknowledgement information. Before sending the acknowledgement information, the terminal receives a total of three pieces of first downlink data, and each piece of first downlink data corresponds to 2 bits of acknowledgement information. In this case, the terminal still needs to send 16 bits of acknowledgement information.

In this embodiment of the present disclosure, after generating the acknowledgement information, the terminal may generate encoded information bits in a coding manner corresponding to the quantity of bits of the acknowledgement information, and send the acknowledgement information by using a PUCCH configured by a base station.

Operation S104. The terminal sends, to the network device on the same PUCCH, the acknowledgement information corresponding to the first downlink data received by the terminal in the A time units.

In this embodiment of the present disclosure, the terminal may send, to the network device on the same PUCCH (for example, on the same PUCCH in the time unit n+k2) based on the quantity of bits used for the acknowledgement information determined based on the first threshold, the acknowledgement information corresponding to the first downlink data received by the terminal in the A time units from the time unit n+k0 to the time unit n+k1. Alternatively, the terminal may send, to the network device on the same PUCCH (for example, on the same PUCCH in the time unit n+k2) based on the quantity of bits used for the acknowledgement information determined based on the second threshold, the acknowledgement information corresponding to the first downlink data received by the terminal in the A time units from the time unit n+k0 to the time unit n+k1. Alternatively, the terminal may send, to the network device on the same PUCCH (for example, on the same PUCCH in the time unit n+k2) based on the quantity of bits used for the acknowledgement information determined based on the third threshold, the acknowledgement information corresponding to the first downlink data received by the terminal in the A time units from the time unit n+k0 to the time unit n+k1.

Figure 3:
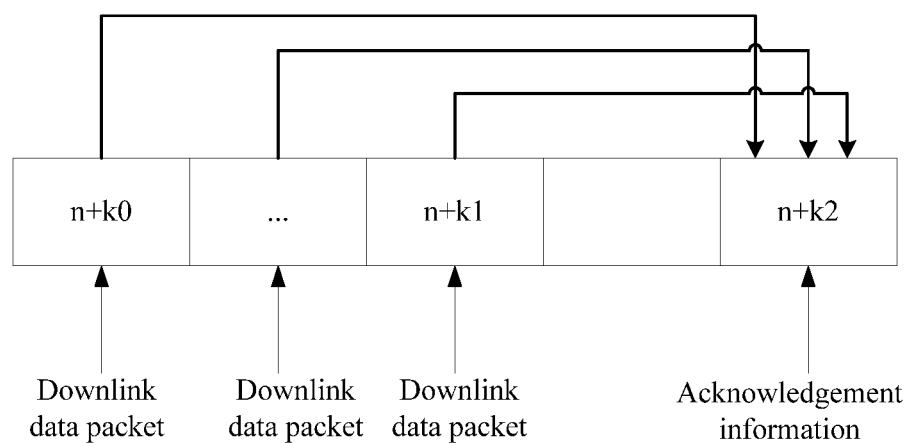
FIG. 3 is a schematic diagram showing sending of acknowledgement information according to an embodiment of the present disclosure.

In this embodiment of the present disclosure, a schematic diagram of a process in which the terminal sends the acknowledgement information for the first downlink data received from the time unit n+k0 to the time unit n+k1 may be shown in FIG. 3.

In this embodiment of the present disclosure, if the terminal receives the downlink scheduling signaling in the A time units from the time unit n+k0 to the time unit n+k1, the terminal may determine, based on the first threshold, the second threshold, or the third threshold, the acknowledgement information corresponding to the first downlink data, then may determine the quantity of bits used for the acknowledgement information, and send the acknowledgement information. In addition, the network device also determines, based on the first threshold, the second threshold, or the third threshold, the quantity of bits used for the acknowledgement information corresponding to the first downlink data. Therefore, in the method provided in this embodiment of the present disclosure, the quantity of bits used for the acknowledgement information determined by the terminal can keep consistent with the quantity of bits used for the acknowledgement information determined by the network device, and a success ratio of decoding the acknowledgement information by the network device can be increased.

Further, in this embodiment of the present disclosure, if the terminal does not receive the downlink scheduling signaling in all the time units, the terminal does not send, to the network device, acknowledgement information corresponding to first downlink data that is correctly received. In this case, the network device may determine, in an energy detection manner, that the terminal does not send the acknowledgement information corresponding to the first downlink data that is correctly received.

The following describes, in detail with reference to an actual application, an acknowledgement information sending process related to this embodiment of the present disclosure.

In one embodiment, in this embodiment of the present disclosure, the downlink scheduling signaling sent by the network device to the terminal may include indication information, and the indication information is used to indicate the first threshold, or used to indicate the second threshold, or used to indicate the third threshold. The terminal receives the downlink scheduling signaling including the indication information, and may directly determine the first threshold, the second threshold, or the third threshold based on the first threshold, the second threshold, or the third threshold indicated by the indication information, thereby reducing signaling indication overheads of the downlink scheduling signaling.

Specifically, the indication information included in the downlink scheduling signaling may indicate the first threshold, the second threshold, or the third threshold by using K bits. K is a positive integer. A value of K is not limited in this embodiment of the present disclosure. In one embodiment, K may be 2 or 3.

The first threshold, the second threshold, or the third threshold may have a plurality of values. Therefore, in this embodiment of the present disclosure, different values of the K bits may be used to indicate different values of the first threshold, or indicate different values of the second threshold, or indicate different values of the third threshold.

Usually, the K bits may correspond to 2K values. For example, K=2 may correspond to four binary values 00, 01, 10, and 11. In this embodiment of the present disclosure, at least one of the 2K values may be used to indicate a different value of the first threshold, and the at least one of the 2K values has a one-to-one correspondence with an indicated value of the first threshold. For example, values of the first threshold include four values 1, 2, 4, and 8. When K=2, the four binary values 00, 01, 10, and 11 may be selected to indicate the four values of the first threshold 1, 2, 4, and 8, and each binary value corresponds to one value of the first threshold. For example, 00 indicates the first threshold with a value 1, 01 indicates the first threshold with a value 2, 10 indicates the first threshold with a value 4, and 11 indicates the first threshold with a value 8. For another example, values of the first threshold include three values 2, 4, and 8. When K=2, three of four binary values 00, 01, 10, and 11 may be selected to indicate the three values of the first threshold 2, 4, and 8, and each binary value corresponds to one value of the first threshold. For example, three binary values 00, 01, and 10 are selected to indicate three different values of the first threshold, 00 indicates the first threshold with a value 2, 01 indicates the first threshold with a value 4, and 10 indicates the first threshold with a value 8.

Certainly, which value of the first threshold a specific binary value correspondingly indicates is not limited in this embodiment of the present disclosure. For example, 00 may alternatively indicate the first threshold with a value 8, 01 indicates the first threshold with a value 4, 10 indicates the first threshold with a value 2, and 11 indicates the first threshold with a value 1.

In this embodiment of the present disclosure, at least one of the 2K values may alternatively be used to indicate a different value of the second threshold, and the at least one of the 2K values has a one-to-one correspondence with an indicated value of the second threshold. Alternatively, in this embodiment of the present disclosure, at least one of the 2K values may be used to indicate a different value of the third threshold, and the at least one of the 2K values has a one-to-one correspondence with an indicated value of the third threshold.

A specific example in which a value of the K bits is used to indicate the value of the second threshold or indicate the value of the third threshold is similar to the foregoing manner in which a value of the K bits is used to indicate the value of the first threshold. Details are not described again in this embodiment of the present disclosure.

In this embodiment of the present disclosure, the network device may send, to the terminal, a binary bit value of the 2K values that is used to indicate the value of the first threshold, a binary bit value used to indicate the value of the second threshold, or a binary bit value used to indicate the value of the third threshold, and the terminal receives the binary bit value used to indicate the value of the first threshold, the binary bit value used to indicate the value of the second threshold, or the binary bit value used to indicate the value of the third threshold, and therefore can determine the value of the first threshold, the value of the second threshold, or the value of the third threshold.

In this embodiment of the present disclosure, the K bits are used to indicate the first threshold, or indicate the second threshold, or indicate the third threshold, and the K bits correspond to the 2K values. At least one of the 2K values has a one-to-one correspondence with the first threshold, or at least one of the 2K values has a one-to-one correspondence with the second threshold, or at least one of the 2K values has a one-to-one correspondence with the third threshold, so that the terminal can accurately determine the value of the first threshold, the value of the second threshold, or the value of the third threshold based on the binary bit value used to indicate the value of the first threshold, the binary bit value used to indicate the value of the second threshold, or the binary bit value used to indicate the value of the third threshold.

Further, when the terminal feeds back the acknowledgement information, a PUCCH format of acknowledgement information (1 bit or 2 bits) corresponding to one piece of first downlink data is different from a format of acknowledgement information (more than two bits) corresponding to a plurality of pieces of first downlink data. Therefore, if the terminal determines, by using the downlink scheduling signaling sent by the network device, that one piece of first downlink data is scheduled by using the downlink scheduling signaling, the PUCCH format of 1 bit or 2 bits may be used to send the acknowledgement information. If the terminal determines, by using the downlink scheduling signaling sent by the network device, that a plurality of pieces of first downlink data are scheduled by using the downlink scheduling signaling, the PUCCH format of more than two bits may be used to send the acknowledgement information. In this embodiment of the present disclosure, to enable the terminal to differentiate between one piece of first downlink data and a plurality of pieces of first downlink data, for sending the acknowledgement information, the value of the first threshold includes at least 1, or the value of the second threshold includes at least M (where M is a positive integer, and one piece of first downlink data corresponds to M codewords), or the value of the third threshold includes at least N (where N is a positive integer, and one piece of first downlink data corresponds to N code block groups).

For example, when the downlink scheduling signaling indicates the value of the first threshold by using the indication information, the first threshold indicated by the indication information includes at least a first threshold with a value 1; or when the downlink scheduling signaling indicates the value of the second threshold by using the indication information, the second threshold indicated by the indication information includes at least a second threshold with a value M; or when the downlink scheduling signaling indicates the value of the third threshold by using the indication information, the third threshold indicated by the indication information includes at least a third threshold with a value N.

For example, when the indication information indicates the first threshold by using the K bits, at least one of the 2K values corresponding to the K bits is used to indicate the first threshold with the value 1; or when the indication information indicates the second threshold by using the K bits, at least one of the 2K values corresponding to the K bits is used to indicate the second threshold with the value M; or when the indication information indicates the third threshold by using the K bits, at least one of the 2K values corresponding to the K bits is used to indicate the third threshold with the value N.

Still further, in this embodiment of the present disclosure, if the terminal sends the acknowledgement information by using a HARQ mechanism, the value of the first threshold may be determined based on a quantity of HARQ processes of the terminal, or the value of the second threshold may be determined based on a quantity of HARQ processes of the terminal, or the value of the third threshold may be determined based on a quantity of HARQ processes of the terminal.

In this embodiment of the present disclosure, the quantity of HARQ processes of the terminal limits a quantity of first downlink data that can be simultaneously processed by the terminal. In theory, if the network device schedules the first downlink data based on the quantity of HARQ processes of the terminal, and acknowledgement information corresponding to all of the first downlink data is acknowledgement information fed back on a same PUCCH, a quantity of acknowledgement information that corresponds to the first downlink data and that needs to be fed back by the terminal also does not exceed the quantity of HARQ processes of the terminal. For example, when the quantity of HARQ processes of the terminal is 8, a maximum value of the first threshold indicated by the downlink scheduling signaling does not need to correspond to 16. Therefore, in this embodiment of the present disclosure, the value of the first threshold, the value of the second threshold, or the value of the third threshold is determined based on the quantity of HARQ processes of the terminal, and when the quantity of HARQ processes of the terminal is relatively small, indication precise of the indication information used to indicate the first threshold, the second threshold, or the third threshold in the downlink scheduling signaling can be improved.

For example, when the quantity of HARQ processes of the terminal is 8, the value of the first threshold determined based on the quantity of HARQ processes of the terminal may be at least one of 2, 4, 6, and 8, or the value of the second threshold determined based on the quantity of HARQ processes may be at least one of 2M, 4M, 6M, and 8M, or the value of the third threshold determined based on the quantity of HARQ processes is at least one of 2N, 4N, 6N, and 8N. For example, if the quantity of HARQ processes of the terminal is 8, and the downlink scheduling signaling indicates the value of the first threshold by using two bits, values of the first threshold may be four values 2, 4, 6, and 8, or values of the first threshold may be four values 1, 2, 4, and 8, or values of the first threshold may be three values 2, 4, and 8. If the quantity of HARQ processes of the terminal is 8, and the downlink scheduling signaling indicates the value of the second threshold by using two bits, values of the second threshold may be four values 2M, 4M, 6M, and 8M, or values of the second threshold may be four values M, 2M, 4M, and 8M, or values of the second threshold may be three values 2M, 4M, and 8M. If the quantity of HARQ processes of the terminal is 8, and the downlink scheduling signaling indicates the value of the third threshold by using two bits, values of the third threshold may be four values 2N, 4N, 6N, and 8N, or values of the second threshold may be four values N, 2N, 4N, and 8N, or values of the second threshold may be three values 2N, 4N, and 8N.

For example, when the quantity of HARQ processes of the terminal is 16, the value of the first threshold determined based on the quantity of HARQ processes of the terminal may be at least one of 4, 8, 12, and 16, or the value of the second threshold determined based on the quantity of HARQ processes may be at least one of 4M, 8M, 12M, and 16M, or the value of the third threshold determined based on the quantity of HARQ processes may be at least one of 4N, 8N, 12N, and 16N. For example, if the quantity of HARQ processes of the terminal is 16, and the downlink scheduling signaling indicates the value of the first threshold by using two bits, values of the first threshold may be four values 4, 8, 12, and 16, or values of the first threshold may be four values 1, 4, 8, and 16, or values of the first threshold may be three values 8, 12, and 16. If the quantity of HARQ processes of the terminal is 16, and the downlink scheduling signaling indicates the value of the second threshold by using two bits, values of the second threshold may be four values 4M, 8M, 12M, and 16M, or values of the second threshold may be four values M, 4M, 8M, and 16M, or values of the second threshold may be three values 8M, 12M, and 16M. If the quantity of HARQ processes of the terminal is 16, and the downlink scheduling signaling indicates the value of the third threshold by using two bits, values of the third threshold may be four values 4N, 8N, 12N, and 16N, or values of the second threshold may be four values N, 4N, 8N, and 16N, or values of the second threshold may be three values 8N, 12N, and 16N.

For example, when the quantity of HARQ processes of the terminal is 16, the value of the first threshold determined based on the quantity of HARQ processes of the terminal may be at least one of 2, 4, 6, 8, 10, 12, 14, and 16, or the value of the second threshold determined based on the quantity of HARQ processes may be at least one of 2M, 4M, 6M, 8M, 10M, 12M, 14M, and 16M, or the value of the third threshold determined based on the quantity of HARQ processes is at least one of 2N, 4N, 6N, 8N, 10N, 12N, 14N, and 16N. For example, if the quantity of HARQ processes of the terminal is 16, and the downlink scheduling signaling indicates the value of the first threshold by using three bits, values of the first threshold may be eight values 2, 4, 6, 8, 10, 12, 14, and 16, or values of the first threshold may be four values 1, 2, 4, 8, 10, 12, 14, and 16, or values of the first threshold may be four values 2, 4, 6, and 8. If the quantity of HARQ processes of the terminal is 16, and the downlink scheduling signaling indicates the value of the second threshold by using three bits, values of the second threshold may be eight values 2M, 4M, 6M, 8M, 10M, 12M, 14M, and 16M, or values of the second threshold may be eight values M, 2M, 4M, 8M, 10M, 12M, 14M, and 16M, or values of the second threshold may be three values 2M, 4M, 6M, and 8M. If the quantity of HARQ processes of the terminal is 16, and the downlink scheduling signaling indicates the value of the third threshold by using three bits, values of the third threshold may be eight values 2N, 4N, 6N, 8N, 10N, 12N, 14N, and 16N, or values of the second threshold may be eight values N, 2N, 4N, 8N, 10N, 12N, 14N, and 16N, or values of the second threshold may be four values 2N, 4N, 6N, and 8N.

In still another embodiment of the present disclosure, the value of the first threshold is configured by the network device by using higher layer signaling, or the value of the second threshold is configured by the network device by using higher layer signaling, or the value of the third threshold is configured by the network device by using higher layer signaling. In this embodiment of the present disclosure, different values of the first threshold, different values of the second threshold, or different thresholds of the third threshold are configured by the network device by using higher layer signaling, and therefore indication flexibility of indicating the first threshold, the second threshold, or the third threshold can be improved. In addition, when indication overheads of the downlink scheduling signaling are the same, the indication precision can be improved.

Further, in the foregoing embodiments, first thresholds determined by using all of the downlink scheduling signaling used by the network device to schedule the first downlink data to the terminal in the A time units are the same. For example, in this embodiment of the present disclosure, if the first threshold has a plurality of values, when the downlink scheduling signaling indicates the values of the first threshold by using the indication information, the values of the first threshold indicated by the indication information included in all of the downlink scheduling signaling sent by the network device to the terminal in the A time units are a same value. Alternatively, second thresholds determined by using all of the downlink scheduling signaling used by the network device to schedule the first downlink data to the terminal in the A time units are the same. For example, in this embodiment of the present disclosure, if the second threshold has a plurality of values, when the downlink scheduling signaling indicates the values of the second threshold by using the indication information, the values of the second threshold indicated by the indication information included in all of the downlink scheduling signaling sent by the network device to the terminal in the A time units are a same value. Alternatively, third thresholds determined by using all of the downlink scheduling signaling used by the network device to schedule the first downlink data to the terminal in the A time units are the same. For example, in this embodiment of the present disclosure, if the third threshold has a plurality of values, when the downlink scheduling signaling indicates the values of the third threshold by using the indication information, the values of the third threshold indicated by the indication information included in all of the downlink scheduling signaling sent by the network device to the terminal in the A time units are a same value.

The foregoing mainly describes, from a perspective of interaction between the network device and the terminal, the solutions provided in the embodiments of the present disclosure. It can be understood that, to implement the foregoing functions, the network device and the terminal include a corresponding hardware structure and/or a corresponding software module for performing all the functions. Units (component or device) and algorithm operations in the examples described with reference to the embodiments disclosed in the present disclosure can be implemented in the embodiments of the present disclosure in a form of hardware or in a form of a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions in the embodiments of the present disclosure.

In the embodiments of the present disclosure, functional unit (component or device) division may be performed on the network device and the terminal based on the foregoing method examples. For example, each functional unit (component or device) may be divided corresponding to each function, or at least two of the foregoing functions may be integrated into one processing unit (component or device). The foregoing integrated unit (component or device) may be implemented in a form of hardware, or may be implemented in a form of a software functional unit (component or device). It should be noted that, in the embodiments of the present disclosure, the unit (component or device) division is an example and is merely logical function division. During actual implementation, there may be other division manners.

Figure 4:
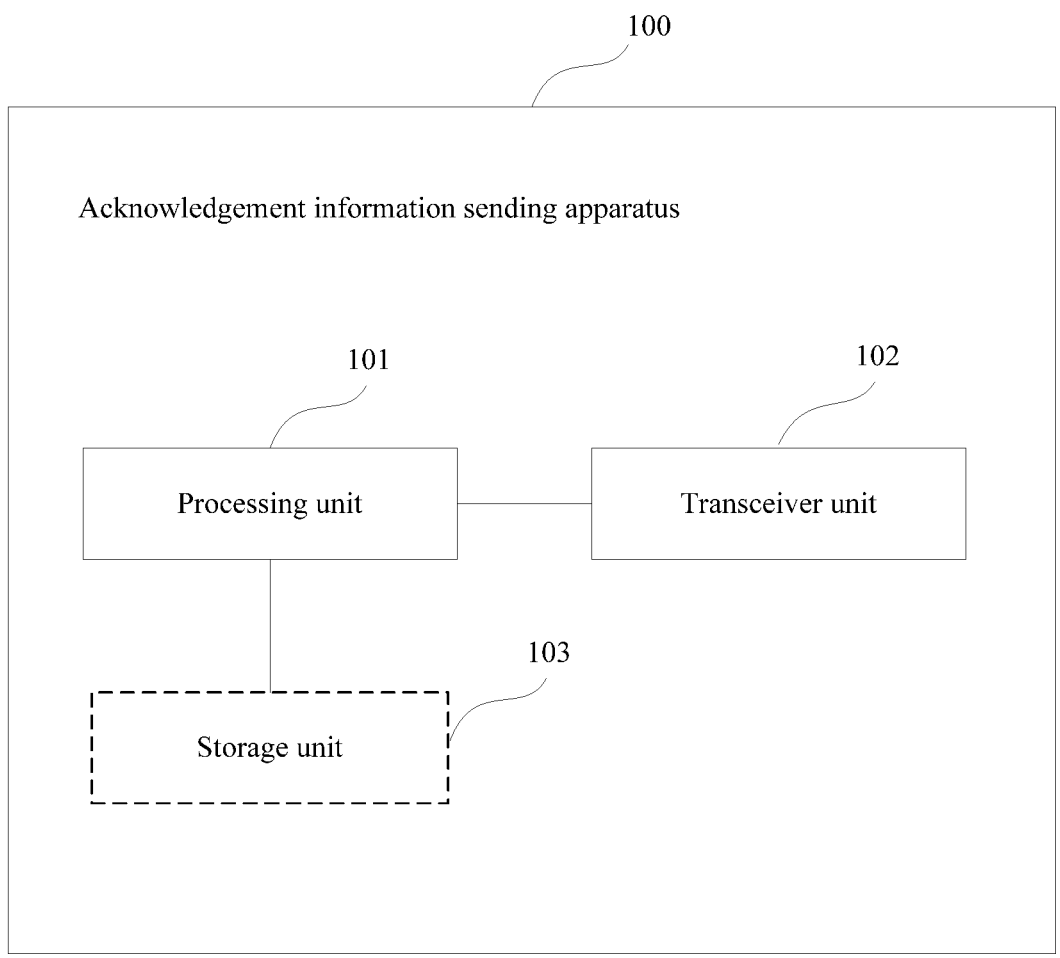
FIG. 4 is a schematic structural diagram of an acknowledgement information sending apparatus applied to a network device according to an embodiment of the present disclosure.

When the integrated unit (component or device) is used, FIG. 4 is a schematic structural diagram of an acknowledgement information sending apparatus 100 according to an embodiment of the present disclosure. As shown in FIG. 4, the acknowledgement information sending apparatus 100 includes a processing unit 101 and a transceiver unit 102. The processing unit 101 is configured to determine downlink scheduling signaling. The transceiver unit 102 sends, to a terminal, the downlink scheduling signaling determined by the processing unit 101.

The downlink scheduling signaling is used by the processing unit 101 to separately schedule first downlink data to the terminal in A time units, A is a positive integer, and the first downlink data is downlink data corresponding to acknowledgement information fed back on a same uplink control channel. The downlink scheduling signaling is used to determine a first threshold, and a total quantity of the first downlink data scheduled by the processing unit 101 to the terminal in the A time units does not exceed the first threshold; or the downlink scheduling signaling is used to determine a second threshold, and a total quantity of codewords of the first downlink data scheduled by the processing unit 101 to the terminal in the A time units does not exceed the second threshold; or the downlink scheduling signaling is used to determine a third threshold, and a total quantity of code block groups of the first downlink data scheduled by the processing unit 101 to the terminal in the A time units does not exceed the third threshold.

In one embodiment, the downlink scheduling signaling includes indication information used to indicate the first threshold, or includes indication information used to indicate the second threshold, or includes indication information used to indicate the third threshold.

In one embodiment, the indication information indicates the first threshold by using K bits, or indicates the second threshold by using K bits, or indicates the third threshold by using K bits.

In one embodiment, the K bits correspond to 2K values, and at least one of the 2K values has a one-to-one correspondence with the first threshold, or at least one of the 2K values has a one-to-one correspondence with the second threshold, or at least one of the 2K values has a one-to-one correspondence with the third threshold.

In one embodiment, the first threshold indicated by the indication information includes at least a first threshold with a value 1, or the second threshold indicated by the indication information includes at least a second threshold with a value M, or the third threshold indicated by the indication information includes at least a third threshold with a value N, and M and N are positive integers.

In one embodiment, a value of the first threshold, a value of the second threshold, or a value of the third threshold is determined based on a quantity of HARQ processes of the terminal.

In one embodiment, when the quantity of HARQ processes of the terminal is 8, the value of the first threshold determined based on the quantity of HARQ processes of the terminal is at least one of 2, 4, 6, and 8, or the value of the second threshold determined based on the quantity of HARQ processes is at least one of 2M, 4M, 6M, and 8M, or the value of the third threshold determined based on the quantity of HARQ processes is at least one of 2N, 4N, 6N, and 8N. Alternatively, when the quantity of HARQ processes of the terminal is 16, the value of the first threshold determined based on the quantity of HARQ processes of the terminal is at least one of 4, 8, 12, and 16, or the value of the second threshold determined based on the quantity of HARQ processes is at least one of 4M, 8M, 12M, and 16M, or the value of the third threshold determined based on the quantity of HARQ processes is at least one of 4N, 8N, 12N, and 16N. Alternatively, when the quantity of HARQ processes of the terminal is 16, the value of the first threshold determined based on the quantity of HARQ processes of the terminal is at least one of 2, 4, 6, 8, 10, 12, 14, and 16, or the value of the second threshold determined based on the quantity of HARQ processes is at least one of 2M, 4M, 6M, 8M, 10M, 12M, 14M, and 16M, or the value of the third threshold determined based on the quantity of HARQ processes is at least one of 2N, 4N, 6N, 8N, 10N, 12N, 14N, and 16N, where M and N are positive integers.

In one embodiment, the value of the first threshold is configured by the processing unit 101 by using higher layer signaling, or the value of the second threshold is configured by the processing unit 101 by using higher layer signaling, or the value of the third threshold is configured by the processing unit 101 by using higher layer signaling.

In one embodiment, first thresholds determined by using all of the downlink scheduling signaling used to schedule the first downlink data to the terminal in the A time units are the same, or second thresholds determined by using all of the downlink scheduling signaling used to schedule the first downlink data to the terminal in the A time units are the same, or third thresholds determined by using all of the downlink scheduling signaling used to schedule the first downlink data to the terminal in the A time units are the same.

In one embodiment, the first downlink data is at least one of a PDSCH scheduled by using a PDCCH, a PDSCH scheduled by using an EPDCCH, and a PDSCH scheduled through SPS.

Further, the acknowledgement information sending apparatus 100 may further include a storage unit 103. The storage unit 103 is configured to store a computer executable instruction. The processing unit 101 is connected to the storage unit 103, and the processing unit 101 executes the computer executable instruction stored in the storage unit 103, so that the acknowledgement information sending apparatus 100 performs the acknowledgement information sending method performed by the network device in the foregoing method embodiments.

When the integrated unit is implemented in the form of hardware, in this embodiment of the present disclosure, the processing unit 101 may be a processor, a controller, or the like, and the transceiver unit 102 may be a transceiver, a communications interface, a transceiver circuit, or the like. The storage unit 103 may be a memory. The communications interface is a collective term, and may include one or more interfaces. The transceiver may include a radio frequency circuit.

Figure 5:
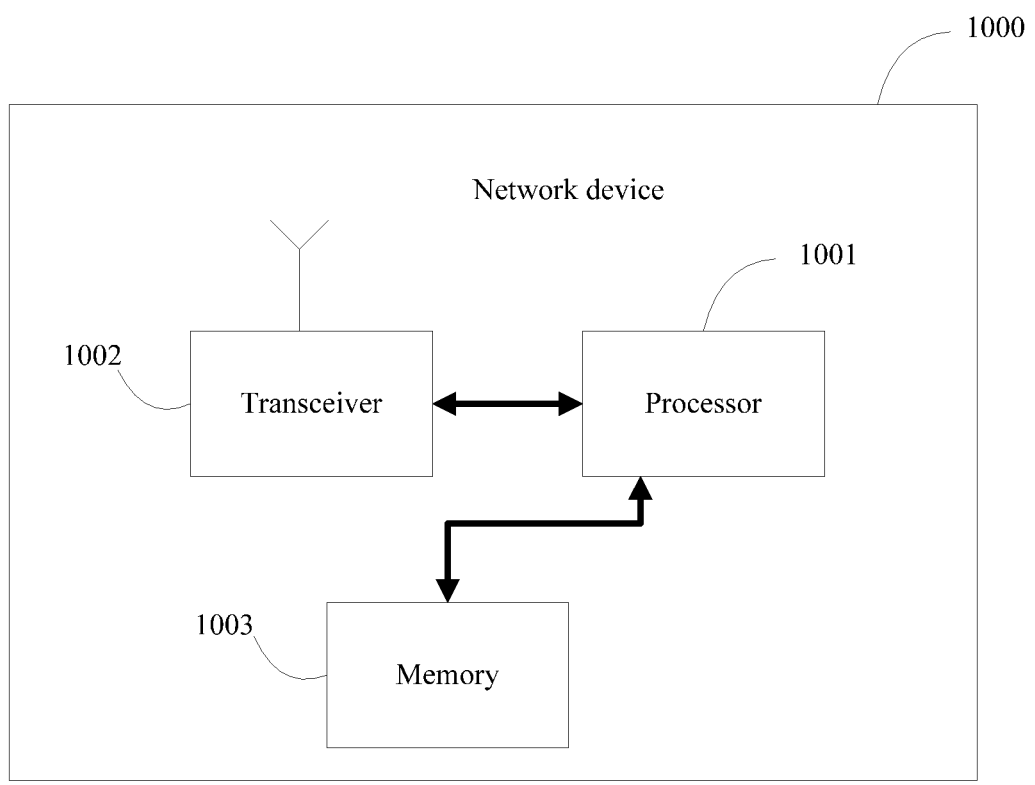
FIG. 5 is another schematic structural diagram of an acknowledgement information sending apparatus applied to a network device according to an embodiment of the present disclosure.

When the processing unit 101 is a processor and the transceiver unit 102 is a transceiver, the acknowledgement information sending apparatus 100 related to this embodiment of the present disclosure may be an acknowledgement information sending apparatus shown in FIG. 5. The acknowledgement information sending apparatus shown in FIG. 5 may be applied to a network device.

FIG. 5 is a schematic structural diagram of a network device 1000 according to an embodiment of the present disclosure, namely, another possible schematic structural diagram of an acknowledgement information sending apparatus 100. As shown in FIG. 5, the network device 1000 includes a processor 1001 and a transceiver 1002. Alternatively, the processor 1001 may be a controller. The processor 1001 is configured to support the network device in performing a related function in FIG. 3. The transceiver 1002 is configured to support a function of sending and receiving a message (for example, sending downlink scheduling signaling) of the network device. The network device may further include a memory 1003. The memory 1003 is configured to be coupled to the processor 1001, and store a program instruction and data that are suitable for the network device. The processor 1001, the transceiver 1002, and the memory 1003 are connected. The memory 1003 is configured to store an instruction. The processor 1001 is configured to execute the instruction stored in the memory 1003, to control the transceiver 1002 to send and receive a message, and to complete the operations of the corresponding functions performed by the network device in the foregoing method.

In this embodiment of the present disclosure, for concepts, explanations, detailed descriptions, and other operations that are related to the acknowledgement information sending apparatus 100 and the network device 1000 and related to the technical solutions provided in the embodiments of the present disclosure, refer to descriptions about the content in the foregoing method embodiments or other embodiments. Details are not described herein again.

When the integrated unit is implemented in a form of a chip, the acknowledgement information sending apparatus 100 related to this embodiment of the present disclosure may be applied to a chip in the network device, and the chip has a function of implementing the acknowledgement information sending method performed by the network device in the foregoing method embodiments. The function may be implemented by hardware, or may be implemented by hardware by executing corresponding software. The hardware or the software includes one or more units corresponding to the function. The chip includes a processing unit 101 and a transceiver unit 102. The processing unit 101 may be a processor, and the transceiver unit 102 may be an input/output interface, a pin, a circuit, or the like on the chip. The chip may further include a storage unit 103. The processing unit 101 may execute a computer executable instruction stored in the storage unit 103, so that the chip performs the acknowledgement information sending method performed by the network device in the foregoing method embodiments. In one embodiment, the storage unit 103 may be a storage unit (for example, a register or a buffer) in the chip. Alternatively, the storage unit 103 may be a storage unit (for example, a read-only memory (ROM)) that is in the network device and that is located outside of the chip, or may be another type of static storage device (for example, a random access memory (RAM)) or the like that can store static information and an instruction.

Based on a same concept in the foregoing method embodiments, an embodiment of the present disclosure further provides another acknowledgement information sending apparatus.

Figure 6:
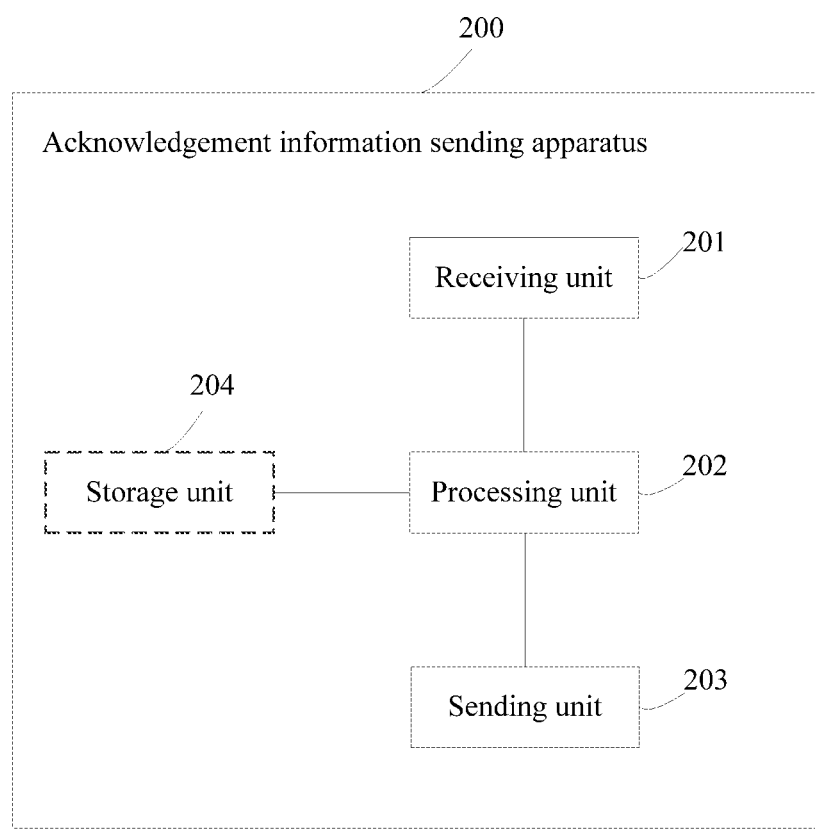
FIG. 6 is a schematic structural diagram of an acknowledgement information sending apparatus applied to a terminal according to an embodiment of the present disclosure.

When the integrated unit (device or component) is used, FIG. 6 is a schematic structural diagram of another acknowledgement information sending apparatus according to an embodiment of the present disclosure. As shown in FIG. 6, the acknowledgement information sending apparatus 200 includes a receiving unit 201, a processing unit 202, and a sending unit 203.

In one embodiment, the receiving unit 201 is configured to separately receive, in A time units, downlink scheduling signaling sent by a network device. A is a positive integer, the downlink scheduling signaling is used to schedule first downlink data, and the first downlink data is downlink data corresponding to acknowledgement information fed back on a same uplink control channel. The downlink scheduling signaling is used to determine a first threshold, and a total quantity of the first downlink data scheduled by using the downlink scheduling signaling received by the receiving unit 201 in the A time units does not exceed the first threshold. The processing unit 202 is configured to determine, based on the first threshold included in the downlink scheduling signaling received by the receiving unit 201, the acknowledgement information corresponding to the first downlink data received in the A time units. The sending unit 203 is configured to send, to the network device on the same uplink control channel, the acknowledgement information that is determined by the processing unit 202 and that corresponds to the first downlink data.

In another embodiment, the receiving unit 201 is configured to separately receive, in A time units, downlink scheduling signaling sent by a network device. A is a positive integer, the downlink scheduling signaling is used to schedule first downlink data, and the first downlink data is downlink data corresponding to acknowledgement information fed back on a same uplink control channel. The downlink scheduling signaling is used to determine a first threshold, and a total quantity of codewords of the first downlink data scheduled by using the downlink scheduling signaling received by the receiving unit 201 in the A time units does not exceed the second threshold. The processing unit 202 is configured to determine, based on the second threshold included in the downlink scheduling signaling received by the receiving unit 201, the acknowledgement information corresponding to the first downlink data received in the A time units. The sending unit 203 is configured to send, to the network device on the same uplink control channel, the acknowledgement information that is determined by the processing unit 202 and that corresponds to the first downlink data.

In still another embodiment, the receiving unit 201 is configured to separately receive, in A time units, downlink scheduling signaling sent by a network device. A is a positive integer, the downlink scheduling signaling is used to schedule first downlink data, and the first downlink data is downlink data corresponding to acknowledgement information fed back on a same uplink control channel. The downlink scheduling signaling is used to determine a first threshold, and a total quantity of code block groups of the first downlink data scheduled by using the downlink scheduling signaling received by the receiving unit 201 in the A time units does not exceed the third threshold. The processing unit 202 is configured to determine, based on the third threshold included in the downlink scheduling signaling received by the receiving unit 201, the acknowledgement information corresponding to the first downlink data received in the A time units. The sending unit 203 is configured to send, to the network device on the same uplink control channel, the acknowledgement information that is determined by the processing unit 202 and that corresponds to the first downlink data.

In one embodiment, the downlink scheduling signaling includes indication information used to indicate the first threshold, or includes indication information used to indicate the second threshold, or includes indication information used to indicate the third threshold.

The indication information may indicate the first threshold by using K bits, or indicate the second threshold by using K bits, or indicate the third threshold by using K bits.

Specifically, the K bits correspond to 2K values, and at least one of the 2K values has a one-to-one correspondence with the first threshold, or at least one of the 2K values has a one-to-one correspondence with the second threshold, or at least one of the 2K values has a one-to-one correspondence with the third threshold.

In one embodiment, the first threshold indicated by the indication information includes at least a first threshold with a value 1, or the second threshold indicated by the indication information includes at least a second threshold with a value M, or the third threshold indicated by the indication information includes at least a third threshold with a value N, and M and N are positive integers.

In yet another embodiment, a value of the first threshold, a value of the second threshold, or a value of the third threshold may be determined based on a quantity of HARQ processes. The quantity of HARQ processes may be understood as a quantity of HARQ processes of a terminal.

When the quantity of HARQ processes is 8, the value of the first threshold determined based on the quantity of HARQ processes is at least one of 2, 4, 6, and 8, or the value of the second threshold determined based on the quantity of HARQ processes is at least one of 2M, 4M, 6M, and 8M, or the value of the third threshold determined based on the quantity of HARQ processes is at least one of 2N, 4N, 6N, and 8N. Alternatively, when the quantity of HARQ processes is 16, the value of the first threshold determined based on the quantity of HARQ processes is at least one of 4, 8, 12, and 16, or the value of the second threshold determined based on the quantity of HARQ processes is at least one of 4M, 8M, 12M, and 16M, or the value of the third threshold determined based on the quantity of HARQ processes is at least one of 4N, 8N, 12N, and 16N. Alternatively, when the quantity of HARQ processes is 16, the value of the first threshold determined based on the quantity of HARQ processes is at least one of 2, 4, 6, 8, 10, 12, 14, and 16, or the value of the second threshold determined based on the quantity of HARQ processes is at least one of 2M, 4M, 6M, 8M, 10M, 12M, 14M, and 16M, or the value of the third threshold determined based on the quantity of HARQ processes is at least one of 2N, 4N, 6N, 8N, 10N, 12N, 14N, and 16N.

In this embodiment of the present disclosure, M and N are positive integers.

In still yet another embodiment, the value of the first threshold is configured by the network device by using higher layer signaling, or the value of the second threshold is configured by the network device by using higher layer signaling, or the value of the third threshold is configured by the network device by using higher layer signaling.

In a further embodiment, first thresholds determined by using all of the downlink scheduling signaling received by the receiving unit 201 in the A time units are the same, or second thresholds determined by using all of the downlink scheduling signaling received by the receiving unit 201 in the A time units are the same, or third thresholds determined by using all of the downlink scheduling signaling received by the receiving unit 201 in the A time units are the same.

In a still further embodiment, the first downlink data is at least one of a PDSCH scheduled by using a PDCCH, a PDSCH scheduled by using an EPDCCH, and a PDSCH scheduled through SPS.

Further, the acknowledgement information sending apparatus 200 may further include a storage unit 204. The storage unit 204 is configured to store a computer executable instruction. The processing unit 202 is connected to the storage unit 204, and the processing unit 202 executes the computer executable instruction stored in the storage unit 204, so that the acknowledgement information sending apparatus 200 performs the acknowledgement information sending method performed by the terminal in the foregoing method embodiments.

When the integrated unit is implemented in a form of hardware, in this embodiment of the present disclosure, the receiving unit 201 may be a communications interface, a receiver, a receiver circuit, or the like. The processing unit 202 may be a processor or a controller. The sending unit 203 may be a communications interface, a transmitter, a transmitter circuit, or the like. The communications interface is a collective term, and may include one or more interfaces. The receiver circuit and the transmitter circuit may be radio frequency circuits.

Figure 7:
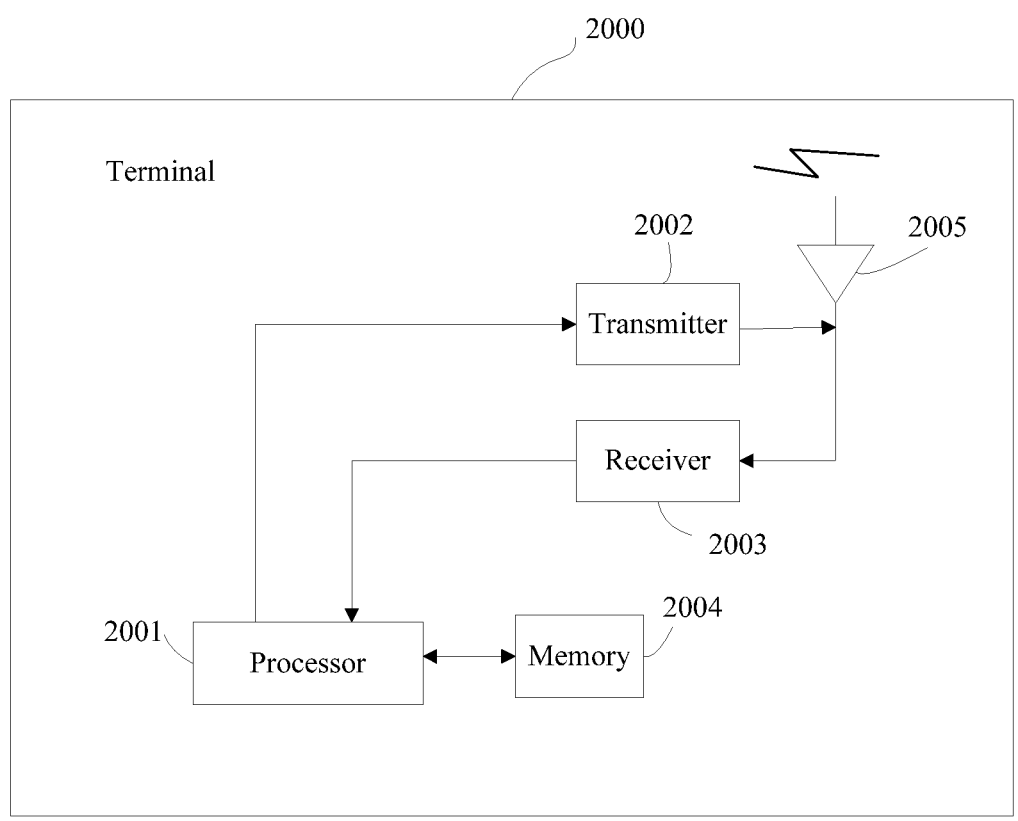
FIG. 7 is another schematic structural diagram of an acknowledgement information sending apparatus applied to a terminal according to an embodiment of the present disclosure.

When the receiving unit 201 is a receiver, and the processing unit 202 is a processor, and the sending unit 203 is a transmitter, the acknowledgement information sending apparatus 200 related to this embodiment of the present disclosure may be an acknowledgement information sending apparatus shown in FIG. 7, and the acknowledgement information sending apparatus shown in FIG. 7 may be applied to a terminal.

FIG. 7 is a schematic structural diagram of a terminal 2000 according to an embodiment of the present disclosure, namely, another possible schematic structural diagram of an acknowledgement information sending apparatus 200. As shown in FIG. 7, the terminal 2000 includes a processor 2001, a transmitter 2002, and a receiver 2003. Alternatively, the processor 2001 may be a controller. The processor 2001 is configured to support the terminal in performing a related function of the terminal in FIG. 2. The transmitter 2002 and the receiver 2003 are configured to support a function of sending and receiving a message between the terminal 2000 and a network device. The terminal 2000 may further include a memory 2004. The memory 2004 is configured to be coupled to the processor 2001, and store a program instruction and data that are suitable for the terminal 2000. The processor 2001, the transmitter 2002, the receiver 2003, and the memory 2004 are connected. The memory 2004 is configured to store an instruction. The processor 2001 is configured to execute the instruction stored in the memory 2004, to control the transmitter 2002 and the receiver 2003 to send and receive a signal, and to complete the operations of the corresponding functions performed by the terminal in the foregoing method.

Further, the terminal 2000 may further include an antenna 2005.

In this embodiment of the present disclosure, for concepts, explanations, detailed descriptions, and other operations that are related to the acknowledgement information sending apparatus 200 and the terminal 2000 and related to the technical solutions provided in the embodiments of the present disclosure, refer to descriptions about the content in the foregoing method embodiments or other embodiments. Details are not described herein again.

When the integrated unit is implemented in a form of a chip, the acknowledgement information sending apparatus 200 related to this embodiment of the present disclosure may be applied to a chip in the terminal, and the chip has a function of implementing the acknowledgement information sending method performed by the terminal in the foregoing method embodiments. The function may be implemented by hardware, or may be implemented by hardware by executing corresponding software. The hardware or the software includes one or more units corresponding to the function. The chip includes a receiving unit 201, a processing unit 202, and a sending unit 203. The processing unit 202 may be a processor, and the receiving unit 201 and the sending unit 203 may be an input/output interface, a pin, a circuit, or the like on the chip. The chip may further include a storage unit 204. The processing unit 202 may execute a computer executable instruction stored in the storage unit 204, so that the chip performs the acknowledgement information sending method performed by the terminal in the foregoing method embodiments. In one embodiment, the storage unit 204 may be a storage unit (for example, a register or a buffer) in the chip. Alternatively, the storage unit may be a storage unit (for example, a read-only memory (ROM)) that is in the terminal and that is located outside of the chip, or may be another type of static storage device (for example, a random access memory (RAM)) or the like that can store static information and an instruction.

It can be understood that the accompanying drawings in the embodiments of the present disclosure merely show simplified designs of the network device and the terminal. During an actual application, the network device and the terminal are not limited to the foregoing structures. For example, an antenna array, a duplexer, and a baseband processing part may be further included.

The duplexer of the network device is configured to implement an antenna array, and is configured to send a signal and receive a signal. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. The receiver and the transmitter may be collectively referred to as a transceiver sometimes. The baseband processing part is configured to: process a sent or received signal, for example, layer mapping, precoding, modulation/demodulation, and encoding/decoding, and separately process a physical control channel, a physical data channel, a physical broadcast channel, a reference signal, and the like. For another example, the terminal may further include a display device and an input/output interface.

The terminal may have a single antenna, or may have a plurality of antennas (to be specific, an antenna array). The duplexer of the terminal is configured to implement the antenna array, and is configured to send a signal and receive a signal. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. The baseband processing part is configured to: process a sent or received signal, for example, layer mapping, precoding, modulation/demodulation, and encoding/decoding, and separately process a physical control channel, a physical data channel, a physical broadcast channel, a reference signal, and the like. In an example, the terminal may alternatively include a control part. The control part is configured to: request a physical uplink resource, calculate channel state information (CSI) corresponding to a downlink channel, determine whether downlink data is successfully received, and so on.

It should be noted that the processor in the embodiments of the present disclosure may be a central processing unit (CPU), a general purpose processor, a digital signal processor (DSP), an application-specific integrated circuit (ASIC), a field programmable gate array (FPGA), or another programmable logic device, a transistor logic device, a hardware component, or a combination thereof. The processor may implement or execute various example logical blocks, modules, and circuits described with reference to content disclosed in the present disclosure. Alternatively, the processor may be a combination of processors implementing a computing function, for example, a combination of one or more microprocessors, or a combination of the DSP and a microprocessor.

The memory may be integrated into the processor, or may be disposed separate from the processor.

In an implementation, functions of the receiver and the transmitter may be considered to be implemented by using a transceiver circuit or a special-purpose transceiver chip. The processor may be considered to be implemented by using a special-purpose processing chip, a processing circuit, a processor, or a general purpose chip.

In another implementation, program code implementing functions of the processor, the receiver, and the transmitter is stored in the memory, and the general purpose processor implements functions of the processor, the receiver, and the transmitter by executing the code in the memory.

According to the method provided in the embodiments of the present disclosure, an embodiment of the present disclosure further provides a communications system. The communications system includes the foregoing network device and one or more terminals.

An embodiment of the present disclosure further provides a computer readable storage medium. The computer readable storage medium is configured to store some instructions. When these instructions are executed, the acknowledgement information sending method performed by the foregoing terminal or network device may be completed.

An embodiment of the present disclosure further provides a computer program product. The computer program product is configured to store a computer program, and the computer program is used to perform the acknowledgement information sending method performed by the terminal or the network device related to the foregoing method embodiments.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including, but not limited to, a disk memory, a CD-ROM, an optical memory, and the like) that include computer-usable program code.

The embodiments of the present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

What is claimed is:

1. An acknowledgement information sending method, comprising:
   determining, by a network device, downlink scheduling signaling, wherein the downlink scheduling signaling is used by the network device to separately schedule first downlink data to a terminal in A time units, wherein A is a positive integer, wherein the first downlink data is downlink data corresponding to acknowledgement information fed back on a same uplink control channel, and wherein the downlink scheduling signaling is used to determine one or more thresholds based on indication information by using K bits, wherein K is a positive integer, the K bits correspond to 2K values, and at least one of the 2K values has a one-to-one correspondence with a first threshold, or at least one of the 2K values has a one-to-one correspondence with a second threshold, or at least one of the 2K values has a one-to-one correspondence a third threshold, the one or more thresholds including:
   the first threshold, wherein a total quantity of the first downlink data scheduled by the network device to the terminal in the A time units does not exceed the first threshold;
   the second threshold, wherein a total quantity of codewords of the first downlink data scheduled by the network device to the terminal in the A time units does not exceed the second threshold; or
   the third threshold, wherein a total quantity of code block groups of the first downlink data scheduled by the network device to the terminal in the A time units does not exceed the third threshold; and
   sending, by the network device, the downlink scheduling signaling to the terminal.

2. The method according to claim 1, wherein the downlink scheduling signaling comprises indication information used to indicate the first threshold, or comprises indication information used to indicate the second threshold, or comprises indication information used to indicate the third threshold.

3. The method according to claim 2, wherein a first value of the K bits is used to indicate a corresponding value of the first threshold, wherein a second value of the K bits is used to indicate a corresponding value of the second threshold, wherein a third value of the K bits is used to indicate a corresponding value of the third threshold.

4. The method according to claim 2, wherein the first threshold indicated by the indication information comprises at least a first threshold with a value 1, or the second threshold indicated by the indication information comprises at least a second threshold with a value M, or the third threshold indicated by the indication information comprises at least a third threshold with a value N, and M and N are positive integers.

5. The method according to claim 2, wherein a value of the first threshold, a value of the second threshold, or a value of the third threshold is determined based on a quantity of hybrid automatic repeat request (HARQ) processes of the terminal.

6. The method according to claim 5, wherein when the quantity of HARQ processes of the terminal is 8, the value of the first threshold determined based on the quantity of HARQ processes of the terminal is at least one of 2, 4, 6, and 8, or the value of the second threshold determined based on the quantity of HARQ processes is at least one of 2M, 4M, 6M, and 8M, or the value of the third threshold determined based on the quantity of HARQ processes is at least one of 2N, 4N, 6N, and 8N; or
   when the quantity of HARQ processes of the terminal is 16, the value of the first threshold determined based on the quantity of HARQ processes of the terminal is at least one of 4, 8, 12, and 16, or the value of the second threshold determined based on the quantity of HARQ processes is at least one of 4M, 8M, 12M, and 16M, or the value of the third threshold determined based on the quantity of HARQ processes is at least one of 4N, 8N, 12N, and 16N; or when the quantity of HARQ processes of the terminal is 16, the value of the first threshold determined based on the quantity of HARQ processes of the terminal is at least one of 2, 4, 6, 8, 10, 12, 14, and 16, or the value of the second threshold determined based on the quantity of HARQ processes is at least one of 2M, 4M, 6M, 8M, 10M, 12M, 14M, and 16M, or the value of the third threshold determined based on the quantity of HARQ processes is at least one of 2N, 4N, 6N, 8N, 10N, 12N, 14N, and 16N, wherein M and N are positive integers.

7. The method according to claim 2, wherein the value of the first threshold is configured by the network device by using higher layer signaling, or the value of the second threshold is configured by the network device by using higher layer signaling, or the value of the third threshold is configured by the network device by using higher layer signaling.

8. The method according to claim 1, wherein first thresholds determined by using all of the downlink scheduling signaling used by the network device to schedule the first downlink data to the terminal in the A time units are the same, or second thresholds determined by using all of the downlink scheduling signaling used by the network device to schedule the first downlink data to the terminal in the A time units are the same, or third thresholds determined by using all of the downlink scheduling signaling used by the network device to schedule the first downlink data to the terminal in the A time units are the same.

9. The method according to claim 1, wherein the first downlink data is at least one of a physical downlink data channel (PDSCH) scheduled by using a physical downlink control channel (PDCCH), a PDSCH scheduled by using an enhanced physical downlink control channel (EPDCCH), and a PDSCH scheduled through semi-persistent scheduling (SPS).

10. An acknowledgement information sending method, comprising:

separately receiving, by a terminal in A time units, downlink scheduling signaling sent by a network device, wherein A is a positive integer, the downlink scheduling signaling is used to schedule first downlink data, the first downlink data is downlink data corresponding to acknowledgement information fed back on a same uplink control channel, the downlink scheduling signaling is used to determine a first threshold based on indication information by using K bits, wherein K is a positive integer, the K bits correspond to 2K values, and at least one of the 2K values has a one-to-one correspondence with the first threshold, or at least one of the 2K values has a one-to-one correspondence with a second threshold, or at least one of the 2K values has a one-to-one correspondence a third threshold, and a total quantity of the first downlink data scheduled by using the downlink scheduling signaling received by the terminal in the A time units does not exceed the first threshold; and determining, by the terminal based on the first threshold, the acknowledgement information corresponding to the first downlink data received in the A time units, and sending the acknowledgement information corresponding to the first downlink data to the network device on the same uplink control channel; or separately receiving, by a terminal in A time units, downlink scheduling signaling sent by a network device, wherein A is a positive integer, the downlink scheduling signaling is used to schedule first downlink data, the first downlink data is downlink data corresponding to acknowledgement information fed back on a same uplink control channel, the downlink scheduling signaling is used to determine the second threshold based on indication information by using K bits, and a total quantity of codewords of the first downlink data scheduled by using the downlink scheduling signaling received by the terminal in the A time units does not exceed the second threshold; and determining, by the terminal based on the second threshold, the acknowledgement information corresponding to the first downlink data received in the A time units, and sending the acknowledgement information corresponding to the first downlink data to the network device on the same uplink control channel; or separately receiving, by a terminal in A time units, downlink scheduling signaling sent by a network device, wherein A is a positive integer, the downlink scheduling signaling is used to schedule first downlink data, the first downlink data is downlink data corresponding to acknowledgement information fed back on a same uplink control channel, the downlink scheduling signaling is used to determine the third threshold based on indication information by using K bits, and a total quantity of code block groups of the first downlink data scheduled by using the downlink scheduling signaling received by the terminal in the A time units does not exceed the third threshold; and determining, by the terminal based on the third threshold, the acknowledgement information corresponding to the first downlink data received in the A time units, and sending the acknowledgement information corresponding to the first downlink data to the network device on the same uplink control channel.

11. The method according to claim 10, wherein the downlink scheduling signaling comprises indication information used to indicate the first threshold, or comprises indication information used to indicate the second threshold, or comprises indication information used to indicate the third threshold.

12. The method according to claim 11, wherein a first value of the K bits is used to indicate a corresponding value of the first threshold, wherein a second value of the K bits is used to indicate a corresponding value of the second threshold, wherein a third value of the K bits is used to indicate a corresponding value of the third threshold.

13. The method according to claim 11, wherein the first threshold indicated by the indication information comprises at least a first threshold with a value 1, or the second threshold indicated by the indication information comprises at least a second threshold with a value M, or the third threshold indicated by the indication information comprises at least a third threshold with a value N, and M and N are positive integers.

14. The method according to claim 11, wherein a value of the first threshold, a value of the second threshold, or a value of the third threshold is determined based on a quantity of hybrid automatic repeat request (HARQ) processes of the terminal.

15. The method according to claim 14, wherein when the quantity of HARQ processes of the terminal is 8, the value of the first threshold determined based on the quantity of HARQ processes of the terminal is at least one of 2, 4, 6, and 8, or the value of the second threshold determined based on the quantity of HARQ processes is at least one of 2M, 4M, 6M, and 8M, or the value of the third threshold determined based on the quantity of HARQ processes is at least one of 2N, 4N, 6N, and 8N; or when the quantity of HARQ processes of the terminal is 16, the value of the first threshold determined based on the quantity of HARQ processes of the terminal is at least one of 4, 8, 12, and 16, or the value of the second threshold determined based on the quantity of HARQ processes is at least one of 4M, 8M, 12M, and 16M, or the value of the third threshold determined based on the quantity of HARQ processes is at least one of 4N, 8N, 12N, and 16N; or when the quantity of HARQ processes of the terminal is 16, the value of the first threshold determined based on the quantity of HARQ processes of the terminal is at least one of 2, 4, 6, 8, 10, 12, 14, and 16, or the value of the second threshold determined based on the quantity of HARQ processes is at least one of 2M, 4M, 6M, 8M, 10M, 12M, 14M, and 16M, or the value of the third threshold determined based on the quantity of HARQ processes is at least one of 2N, 4N, 6N, 8N, 10N, 12N, 14N, and 16N, wherein M and N are positive integers.

16. The method according to claim 11, wherein the value of the first threshold is configured by the network device by using higher layer signaling, or the value of the second threshold is configured by the network device by using higher layer signaling, or the value of the third threshold is configured by the network device by using higher layer signaling.

17. The method according to claim 10, wherein first thresholds determined by using all of the downlink scheduling signaling received by the terminal in the A time units are the same, or second thresholds determined by using all of the downlink scheduling signaling received by the terminal in the A time units are the same, or third thresholds determined by using all of the downlink scheduling signaling received by the terminal in the A time units are the same.

18. An acknowledgement information sending apparatus, comprising a processing unit and a transceiver unit, wherein the processing unit is configured to determine downlink scheduling signaling, wherein the downlink scheduling signaling is used by the processing unit to separately schedule first downlink data to a terminal in A time units, A is a positive integer, the first downlink data is downlink data corresponding to acknowledgement information fed back on a same uplink control channel, and the downlink scheduling signaling is used to determine one or more thresholds based on indication information by using K bits, wherein K is a positive integer, the K bits correspond to 2K values, and at least one of the 2K values has a one-to-one correspondence with a first threshold, or at least one of the 2K values has a one-to-one correspondence with a second threshold, or at least one of the 2K values has a one-to-one correspondence a third threshold, the one or more thresholds including:

the first threshold, wherein a total quantity of the first downlink data scheduled by the processing unit to the terminal in the A time units does not exceed the first threshold;

the second threshold, wherein a total quantity of codewords of the first downlink data scheduled by the processing unit to the terminal in the A time units does not exceed the second threshold; or the third threshold, wherein a total quantity of code block groups of the first downlink data scheduled by the processing unit to the terminal in the A time units does not exceed the third threshold; and the transceiver unit sends, to the terminal, the downlink scheduling signaling determined by the processing unit.

* * * * *